United States Patent
Hsu et al.

(10) Patent No.: US 9,513,465 B2
(45) Date of Patent: Dec. 6, 2016

(54) CAMERA DEVICE AND OPTICAL IMAGING LENS THEREOF

(71) Applicant: GeniuS Electronic Optical Co., Ltd., Taichung (TW)

(72) Inventors: Sheng Wei Hsu, Taichung (TW); Tzu Chien Tang, Taichung (TW); Chih Yang Yeh, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 85 days.

(21) Appl. No.: 14/244,730

(22) Filed: Apr. 3, 2014

(65) Prior Publication Data

US 2015/0177485 A1  Jun. 25, 2015

(30) Foreign Application Priority Data

Dec. 20, 2013 (TW) .............................. 102147542 A

(51) Int. Cl.
| | | |
|---|---|---|
| *G02B 13/18* | (2006.01) | |
| *G02B 9/62* | (2006.01) | |
| *G02B 13/00* | (2006.01) | |

(52) U.S. Cl.
CPC .............. *G02B 13/0045* (2013.01); *G02B 9/62* (2013.01); *G02B 13/0015* (2013.01)

(58) Field of Classification Search
CPC .......... G02B 9/00; G02B 9/62; G02B 13/00; G02B 13/001; G02B 13/0015; G02B 13/0045

See application file for complete search history.

(56) References Cited

U.S. PATENT DOCUMENTS

| | | | | |
|---|---|---|---|---|
| 5,455,714 A | * | 10/1995 | Kohno | G02B 15/177 359/689 |
| 5,870,234 A | * | 2/1999 | Ebbesmeier nee Schitthof | G02B 13/06 359/713 |
| 7,580,206 B2 | * | 8/2009 | Chang | G02B 9/60 359/717 |
| 7,609,313 B2 | * | 10/2009 | Yamaguchi | H04N 5/2254 348/335 |
| 7,907,352 B2 | | 3/2011 | Miyano | |
| 8,040,618 B2 | | 10/2011 | Kitahara | |
| 8,164,834 B2 | | 4/2012 | Miyano | |
| 8,248,715 B2 | | 8/2012 | Asami et al. | |
| 8,320,048 B2 | | 11/2012 | Yamamoto | |
| 8,355,215 B2 | | 1/2013 | Asami | |
| 8,432,619 B2 | | 4/2013 | Huang | |
| 8,456,763 B2 | | 6/2013 | Hsieh et al. | |
| 2004/0130798 A1 | * | 7/2004 | Zhang | G02B 13/16 359/649 |
| 2012/0170142 A1 | * | 7/2012 | Hsieh | G02B 9/62 359/762 |
| 2013/0120858 A1 | * | 5/2013 | Sano | G02B 9/62 359/713 |
| 2015/0177482 A1 | * | 6/2015 | Bone | G03B 17/565 348/335 |

FOREIGN PATENT DOCUMENTS

| | | |
|---|---|---|
| JP | 2005258064 | 9/2005 |
| TW | I268381 | 12/2006 |
| TW | M354744 | 4/2009 |
| TW | M355391 | 4/2009 |
| TW | 201011337 | 3/2010 |

(Continued)

*Primary Examiner* — Thong Nguyen

(74) *Attorney, Agent, or Firm* — Baker & McKenzie LLP

(57) ABSTRACT

The present invention provides a camera device and an optical imaging lens thereof. The optical imaging lens comprises six lens elements positioned in an order from an object side to an image side. Through controlling the convex or concave shape of the surfaces of the lens elements, the view angle of the optical imaging lens is efficiently increased to shows better optical characteristics.

15 Claims, 27 Drawing Sheets

(56) References Cited

FOREIGN PATENT DOCUMENTS

| TW | I325064 | 5/2010 |
| TW | 201038968 | 11/2010 |
| TW | M398126 | 2/2011 |
| TW | 201111828 | 4/2011 |
| TW | 201245757 | 11/2012 |
| TW | 201317618 | 5/2013 |
| TW | 201337320 | 9/2013 |

\* cited by examiner

| f(Focus)= 3.293mm, HPOV(Half angular field of view)= 40.68deg., Fno=2.00 ||||||||
|---|---|---|---|---|---|---|---|
| Surface # | | Radius | Thickness | Refractive index | Abbe number | Material | Focus |
| - | Object | ∞ | ∞ | | | | |
| 111 | 1st lens element | 78.183 | 0.800 | 1.535 | 56.114 | plastic | -4.790 |
| 112 | | 2.475 | 0.549 | | | | |
| 121 | 2nd lens element | 3.482 | 1.695 | 1.535 | 56.114 | plastic | 23.747 |
| 122 | | 3.980 | 1.093 | | | | |
| 131 | 3rd lens element | 8.585 | 0.958 | 1.535 | 56.114 | plastic | 7.136 |
| 132 | | -6.618 | 0.213 | | | | |
| 100 | Aperture stop | ∞ | -0.104 | | | | |
| 141 | 4th lens element | 4.284 | 1.204 | 1.757 | 49.624 | glass | 5.659 |
| 142 | | ∞ | 0.976 | | | | |
| 151 | 5th lens element | -3.459 | 0.644 | 1.535 | 56.114 | plastic | 11.730 |
| 152 | | -2.376 | 0.407 | | | | |
| 161 | 6th lens element | 6.040 | 1.293 | 1.535 | 56.114 | plastic | -12.258 |
| 162 | | 2.911 | 0.800 | | | | |
| 171 | filter | ∞ | 0.300 | | | | |
| 172 | | ∞ | 0.617 | | | | |
| 180 | Image plane | ∞ | -0.008 | | | | |

FIG. 4

| Aspherical parameters | | | | | |
|---|---|---|---|---|---|
| Surface # | 111 | 112 | 121 | 122 | 131 |
| K | 0.000E+00 | -5.737E-01 | 0.000E+00 | 0.000E+00 | 1.742E-01 |
| $a_4$ | 1.945E-03 | -1.941E-02 | -1.794E-02 | 3.217E-02 | 1.551E-02 |
| $a_6$ | -7.900E-05 | 0.000E+00 | 0.000E+00 | 6.038E-03 | 7.547E-04 |
| $a_8$ | 0.000E+00 | 0.000E+00 | 0.000E+00 | 1.335E-03 | -1.221E-03 |
| $a_{10}$ | 0.000E+00 | 0.000E+00 | 0.000E+00 | 0.000E+00 | 2.402E-04 |
| $a_{12}$ | | | | | |
| Surface # | 132 | 151 | 152 | 161 | 162 |
| K | 0.000E+00 | 0.000E+00 | 0.000E+00 | 0.000E+00 | 0.000E+00 |
| $a_4$ | -2.898E-03 | -1.645E-02 | 4.341E-03 | -3.222E-02 | -3.323E-02 |
| $a_6$ | -2.933E-04 | -9.010E-03 | -8.841E-04 | 3.297E-03 | 2.912E-03 |
| $a_8$ | -6.077E-04 | 0.000E+00 | 6.107E-04 | -1.937E-04 | -2.004E-04 |
| $a_{10}$ | 1.999E-04 | 0.000E+00 | 0.000E+00 | 0.000E+00 | 0.000E+00 |
| $a_{12}$ | | | | | |

FIG. 5

| f(Focus)= 2.569mm, HFOV(Half angular field of view)= 48.79deg., Fno=2.00 ||||||||
|---|---|---|---|---|---|---|---|
| Surface # | | Radius | Thickness | Refractive index | Abbe number | Material | Focus |
| - | Object | ∞ | ∞ | | | | |
| 211 | 1st lens element | 9.265 | 0.800 | 1.535 | 56.114 | plastic | -4.432 |
| 212 | | 1.832 | 1.690 | | | | |
| 221 | 2nd lens element | 4.300 | 0.500 | 1.535 | 56.114 | plastic | -22.240 |
| 222 | | 3.031 | 1.290 | | | | |
| 231 | 3rd lens element | 10.163 | 0.888 | 1.535 | 56.114 | plastic | 8.898 |
| 232 | | -8.696 | 0.150 | | | | |
| 200 | Aperture stop | ∞ | -0.111 | | | | |
| 241 | 4th lens element | 4.556 | 1.211 | 1.757 | 49.624 | glass | 6.017 |
| 242 | | ∞ | 0.493 | | | | |
| 251 | 5th lens element | -8.639 | 0.640 | 1.535 | 56.114 | plastic | 10.076 |
| 252 | | -3.407 | 2.369 | | | | |
| 261 | 6th lens element | 5.619 | 0.700 | 1.535 | 56.114 | plastic | 95.750 |
| 262 | | 6.036 | 0.800 | | | | |
| 271 | filter | ∞ | 0.300 | | | | |
| 272 | | ∞ | 0.287 | | | | |
| 280 | Image plane | ∞ | -0.008 | | | | |

FIG. 8

| Aspherical parameters | | | | | |
|---|---|---|---|---|---|
| Surface # | 211 | 212 | 221 | 222 | 231 |
| K | 0.000E+00 | -3.828E-01 | 0.000E+00 | 0.000E+00 | 2.990E-01 |
| $a_4$ | 2.032E-03 | -6.416E-03 | -1.274E-02 | 1.929E-02 | 1.548E-02 |
| $a_6$ | 3.696E-05 | 0.000E+00 | 0.000E+00 | 3.781E-03 | 7.176E-04 |
| $a_8$ | 0.000E+00 | 0.000E+00 | 0.000E+00 | 1.755E-03 | -5.385E-04 |
| $a_{10}$ | 0.000E+00 | 0.000E+00 | 0.000E+00 | 0.000E+00 | 1.512E-04 |
| $a_{12}$ | | | | | |
| Surface # | 232 | 251 | 252 | 261 | 262 |
| K | 0.000E+00 | 0.000E+00 | 0.000E+00 | 0.000E+00 | 0.000E+00 |
| $a_4$ | -2.189E-03 | -2.297E-02 | -7.335E-05 | -1.784E-02 | -1.161E-02 |
| $a_6$ | -9.679E-04 | -4.599E-03 | -1.606E-03 | -4.990E-04 | -7.256E-04 |
| $a_8$ | -6.133E-05 | 0.000E+00 | 5.039E-04 | -1.178E-04 | -8.703E-06 |
| $a_{10}$ | 1.999E-04 | 0.000E+00 | 0.000E+00 | 0.000E+00 | 0.000E+00 |
| $a_{12}$ | | | | | |

FIG. 9

| \multicolumn{7}{|c|}{f(Focus)= 3.128mm, HFOV(Half angular field of view)= 42.00deg., Fno=2.00} |
|---|---|---|---|---|---|---|---|
| Surface # | | Radius | Thickness | Refractive index | Abbe number | Material | Focus |
| - | Object | ∞ | ∞ | | | | |
| 311 | 1st lens element | -33.912 | 0.800 | 1.535 | 56.114 | plastic | -3.768 |
| 312 | | 2.163 | 0.313 | | | | |
| 321 | 2nd lens element | 2.766 | 1.391 | 1.535 | 56.114 | plastic | 8.136 |
| 322 | | 6.245 | 1.673 | | | | |
| 331 | 3rd lens element | 10.102 | 0.703 | 1.535 | 56.114 | plastic | 10.981 |
| 332 | | -13.727 | 0.150 | | | | |
| 300 | Aperture stop | ∞ | 0.163 | | | | |
| 341 | 4th lens element | 4.491 | 1.214 | 1.757 | 49.624 | glass | 5.931 |
| 342 | | ∞ | 1.683 | | | | |
| 351 | 5th lens element | -11.437 | 0.610 | 1.535 | 56.114 | plastic | 7.715 |
| 352 | | -3.091 | 0.172 | | | | |
| 361 | 6th lens element | 6.216 | 1.371 | 1.535 | 56.114 | plastic | -15.483 |
| 362 | | 3.279 | 0.800 | | | | |
| 371 | filter | ∞ | 0.300 | | | | |
| 372 | | ∞ | 0.375 | | | | |
| 380 | Image plane | ∞ | -0.008 | | | | |

FIG. 12

| Aspherical parameters | | | | | |
|---|---|---|---|---|---|
| Surface # | 311 | 312 | 321 | 322 | 331 |
| K | 0.000E+00 | -4.835E-01 | 0.000E+00 | 0.000E+00 | -1.272E+01 |
| $a_4$ | 3.289E-03 | -1.304E-02 | -1.540E-03 | 3.152E-02 | 8.219E-03 |
| $a_6$ | -6.794E-05 | 0.000E+00 | 0.000E+00 | 1.273E-03 | -1.323E-03 |
| $a_8$ | 0.000E+00 | 0.000E+00 | 0.000E+00 | 8.088E-04 | -1.962E-04 |
| $a_{10}$ | 0.000E+00 | 0.000E+00 | 0.000E+00 | 0.000E+00 | -4.076E-05 |
| $a_{12}$ | | | | | |
| Surface # | 332 | 351 | 352 | 361 | 362 |
| K | 0.000E+00 | 0.000E+00 | 0.000E+00 | 0.000E+00 | 0.000E+00 |
| $a_4$ | -3.191E-03 | -9.976E-03 | 1.226E-02 | -2.143E-02 | -3.801E-02 |
| $a_6$ | -3.721E-04 | -4.619E-03 | -5.847E-04 | 4.721E-03 | 3.095E-03 |
| $a_8$ | -9.408E-04 | 0.000E+00 | 3.917E-04 | -4.987E-04 | -2.474E-04 |
| $a_{10}$ | 1.999E-04 | 0.000E+00 | 0.000E+00 | 0.000E+00 | 0.000E+00 |
| $a_{12}$ | | | | | |

FIG. 13

| f(Focus)= 2.374mm, HFOV(Half angular field of view)= 49.93deg., Fno=2.00 | | | | | | | |
|---|---|---|---|---|---|---|---|
| Surface # | | Radius | Thickness | Refractive index | Abbe number | Material | Focus |
| - | Object | ∞ | ∞ | | | | |
| 411 | 1st lens element | ∞ | ∞ | | | | |
| 412 | | 11.441 | 0.800 | 1.535 | 56.114 | plastic | -4.049 |
| 421 | 2nd lens element | 1.778 | 2.337 | | | | |
| 422 | | 3.135 | 0.751 | 1.535 | 56.114 | plastic | 44.568 |
| 431 | 3rd lens element | 3.307 | 1.046 | | | | |
| 432 | | 11.493 | 1.425 | 1.535 | 56.114 | plastic | 7.748 |
| 400 | Aperture stop | -6.211 | 0.152 | | | | |
| 441 | 4th lens element | ∞ | -0.050 | | | | |
| 442 | | 5.110 | 1.200 | 1.757 | 49.624 | glass | 6.750 |
| 451 | 5th lens element | ∞ | 0.909 | | | | |
| 452 | | -3.221 | 0.647 | 1.535 | 56.114 | plastic | 13.360 |
| 461 | 6th lens element | -2.376 | 0.120 | | | | |
| 462 | | 11.995 | 0.900 | 1.535 | 56.114 | plastic | 38.448 |
| 471 | filter | 27.992 | 0.800 | | | | |
| 472 | | ∞ | 0.300 | | | | |
| 480 | Image plane | ∞ | 1.635 | | | | |

FIG. 16

| Aspherical parameters | | | | | |
|---|---|---|---|---|---|
| Surface # | 411 | 412 | 421 | 422 | 431 |
| K | 0.000E+00 | -6.148E-01 | 0.000E+00 | 0.000E+00 | 3.464E+01 |
| $a_4$ | 8.761E-04 | -8.431E-03 | -1.831E-02 | 1.100E-02 | 1.453E-02 |
| $a_6$ | 2.882E-05 | 0.000E+00 | 0.000E+00 | 4.595E-03 | 4.121E-03 |
| $a_8$ | 0.000E+00 | 0.000E+00 | 0.000E+00 | 2.092E-03 | -1.313E-03 |
| $a_{10}$ | 0.000E+00 | 0.000E+00 | 0.000E+00 | 0.000E+00 | 2.075E-04 |
| $a_{12}$ | | | | | |
| Surface # | 432 | 451 | 452 | 461 | 462 |
| K | 0.000E+00 | 0.000E+00 | 0.000E+00 | 0.000E+00 | 0.000E+00 |
| $a_4$ | -2.714E-03 | -8.024E-03 | 1.993E-02 | -1.622E-02 | -2.615E-02 |
| $a_6$ | 3.569E-04 | -9.454E-03 | -3.544E-03 | 4.132E-03 | 5.035E-03 |
| $a_8$ | -4.350E-04 | 0.000E+00 | 2.653E-04 | -3.669E-04 | -2.992E-04 |
| $a_{10}$ | 1.999E-04 | 0.000E+00 | 0.000E+00 | 0.000E+00 | 0.000E+00 |
| $a_{12}$ | | | | | |

FIG. 17

| f(Focus)= 3.193mm, HFOV(Half angular field of view)= 42.89deg., Fno=2.00 ||||||||
|---|---|---|---|---|---|---|---|
| Surface # | | Radius | Thickness | Refractive index | Abbe number | Material | Focus |
| - | Object | ∞ | ∞ | | | | |
| 511 | 1st lens element | ∞ | ∞ | | | | |
| 512 | | -108.298 | 0.800 | 1.535 | 56.114 | plastic | -3.899 |
| 521 | 2nd lens element | 2.134 | 0.972 | | | | |
| 522 | | 3.205 | 1.475 | 1.535 | 56.114 | plastic | 15.577 |
| 531 | 3rd lens element | 4.370 | 2.079 | | | | |
| 532 | | 17.268 | 1.170 | 1.535 | 56.114 | plastic | 8.509 |
| 500 | Aperture stop | -6.042 | 0.150 | | | | |
| 541 | 4th lens element | ∞ | -0.066 | | | | |
| 542 | | 7.086 | 1.200 | 1.757 | 49.624 | glass | 9.358 |
| 551 | 5th lens element | ∞ | 2.573 | | | | |
| 552 | | 21.673 | 0.995 | 1.535 | 56.114 | plastic | 7.765 |
| 561 | 6th lens element | -5.062 | 1.429 | | | | |
| 562 | | -24.570 | 0.700 | 1.535 | 56.114 | plastic | -17.185 |
| 571 | filter | 14.857 | 0.800 | | | | |
| 572 | | ∞ | 0.300 | | | | |
| 580 | Image plane | ∞ | 0.168 | | | | |

FIG. 20

| Aspherical parameters | | | | | |
|---|---|---|---|---|---|
| Surface # | 511 | 512 | 521 | 522 | 531 |
| K | 0.000E+00 | -4.354E-01 | 0.000E+00 | 0.000E+00 | -1.624E+02 |
| $a_4$ | 1.869E-03 | -1.204E-02 | -2.730E-03 | 2.038E-02 | 1.056E-02 |
| $a_6$ | -4.745E-06 | 0.000E+00 | 0.000E+00 | 1.548E-03 | 5.537E-04 |
| $a_8$ | 0.000E+00 | 0.000E+00 | 0.000E+00 | 4.285E-04 | -2.556E-04 |
| $a_{10}$ | 0.000E+00 | 0.000E+00 | 0.000E+00 | 0.000E+00 | 1.208E-04 |
| $a_{12}$ | | | | | |
| Surface # | 532 | 551 | 552 | 561 | 562 |
| K | 0.000E+00 | 0.000E+00 | 0.000E+00 | 0.000E+00 | 0.000E+00 |
| $a_4$ | -2.167E-04 | -1.522E-02 | -6.123E-03 | -2.207E-02 | -2.796E-02 |
| $a_6$ | 1.600E-03 | -3.603E-03 | -2.367E-03 | 5.245E-03 | 4.658E-03 |
| $a_8$ | -6.877E-04 | 0.000E+00 | 1.701E-04 | -3.329E-04 | -2.709E-04 |
| $a_{10}$ | 1.999E-04 | 0.000E+00 | 0.000E+00 | 0.000E+00 | 0.000E+00 |
| $a_{12}$ | | | | | |

FIG. 21

| f(Focus)= 2.297mm, HFOV(Half angular field of view)= 51.38deg., Fno=2.00 | | | | | | | |
|---|---|---|---|---|---|---|---|
| Surface # | | Radius | Thickness | Refractive index | Abbe number | Material | Focus |
| - | Object | ∞ | ∞ | | | | |
| 611 | 1st lens element | 28.959 | 0.800 | 1.535 | 56.114 | plastic | -3.780 |
| 612 | | 1.874 | 1.511 | | | | |
| 621 | 2nd lens element | 3.336 | 1.507 | 1.535 | 56.114 | plastic | 33.306 |
| 622 | | 3.457 | 1.177 | | | | |
| 631 | 3rd lens element | 9.581 | 0.854 | 1.535 | 56.114 | plastic | 7.253 |
| 632 | | -6.328 | 0.150 | | | | |
| 600 | Aperture stop | ∞ | -0.050 | | | | |
| 641 | 4th lens element | 4.877 | 1.200 | 1.757 | 49.624 | glass | 6.442 |
| 642 | | ∞ | 0.477 | | | | |
| 651 | 5th lens element | -5.099 | 0.669 | 1.535 | 56.114 | plastic | 9.365 |
| 652 | | -2.644 | 1.531 | | | | |
| 661 | 6th lens element | 4.342 | 0.700 | 1.535 | 56.114 | plastic | -765.469 |
| 662 | | 4.055 | 0.800 | | | | |
| 671 | filter | ∞ | 0.300 | | | | |
| 672 | | ∞ | 0.381 | | | | |
| 680 | Image plane | ∞ | -0.008 | | | | |

FIG. 24

| Aspherical parameters | | | | | |
|---|---|---|---|---|---|
| Surface # | 611 | 612 | 621 | 622 | 631 |
| K | 0.000E+00 | -6.488E-01 | 0.000E+00 | 0.000E+00 | 2.680E-01 |
| $a_4$ | 8.460E-04 | -1.596E-02 | -1.412E-02 | 2.601E-02 | 1.586E-02 |
| $a_6$ | 2.412E-05 | 0.000E+00 | 0.000E+00 | 5.785E-03 | 3.610E-03 |
| $a_8$ | 0.000E+00 | 0.000E+00 | 0.000E+00 | 2.853E-03 | -1.376E-03 |
| $a_{10}$ | 0.000E+00 | 0.000E+00 | 0.000E+00 | 0.000E+00 | 4.470E-04 |
| $a_{12}$ | | | | | |
| Surface # | 632 | 651 | 652 | 661 | 662 |
| K | 0.000E+00 | 0.000E+00 | 0.000E+00 | 0.000E+00 | 0.000E+00 |
| $a_4$ | -4.709E-04 | -1.313E-02 | 1.030E-02 | -2.283E-02 | -1.998E-02 |
| $a_6$ | 9.440E-04 | -2.543E-03 | 1.584E-03 | 1.967E-03 | 5.607E-04 |
| $a_8$ | -2.348E-05 | 0.000E+00 | 3.491E-05 | -3.321E-04 | -8.757E-05 |
| $a_{10}$ | 1.999E-04 | 0.000E+00 | 0.000E+00 | 0.000E+00 | 0.000E+00 |
| $a_{12}$ | | | | | |

FIG. 25

| f(Focus)= 2.525mm, HFOV(Half angular field of view)= 49.17deg., Fno=2.00 ||||||||
|---|---|---|---|---|---|---|---|
| Surface # | | Radius | Thickness | Refractive index | Abbe number | Material | Focus |
| - | Object | ∞ | | | | | |
| 711 | 1st lens element | 14.036 | 0.800 | 1.535 | 56.114 | plastic | -4.399 |
| 712 | | 1.977 | 2.500 | | | | |
| 721 | 2nd lens element | 4.875 | 0.668 | 1.535 | 56.114 | plastic | -70.643 |
| 722 | | 4.112 | 0.988 | | | | |
| 731 | 3rd lens element | 15.292 | 1.600 | 1.535 | 56.114 | plastic | 6.760 |
| 732 | | -4.569 | 0.150 | | | | |
| 700 | Aperture stop | ∞ | -0.028 | | | | |
| 741 | 4th lens element | 7.312 | 4.808 | 1.757 | 49.624 | glass | 7.653 |
| 742 | | -20.013 | 0.808 | | | | |
| 751 | 5th lens element | 25.883 | 0.900 | 1.535 | 56.114 | plastic | 9.104 |
| 752 | | -5.933 | 0.190 | | | | |
| 761 | 6th lens element | 4.956 | 0.700 | 1.535 | 56.114 | plastic | -19.620 |
| 762 | | 3.202 | 0.800 | | | | |
| 771 | filter | ∞ | 0.300 | | | | |
| 772 | | ∞ | 0.532 | | | | |
| 780 | Image plane | ∞ | -0.008 | | | | |

FIG. 28

| Aspherical parameters | | | | | |
|---|---|---|---|---|---|
| Surface # | 711 | 712 | 721 | 722 | 731 |
| K | 0.000E+00 | -4.941E-01 | 0.000E+00 | 0.000E+00 | -1.622E+01 |
| $a_4$ | 1.141E-03 | -6.942E-03 | -1.513E-02 | 3.756E-03 | 1.234E-02 |
| $a_6$ | 2.182E-05 | 0.000E+00 | 0.000E+00 | 3.310E-03 | 3.237E-03 |
| $a_8$ | 0.000E+00 | 0.000E+00 | 0.000E+00 | 2.016E-04 | -5.917E-04 |
| $a_{10}$ | 0.000E+00 | 0.000E+00 | 0.000E+00 | 0.000E+00 | 1.570E-04 |
| $a_{12}$ | | | | | |
| Surface # | 732 | 751 | 752 | 761 | 762 |
| K | 0.000E+00 | 0.000E+00 | 0.000E+00 | 0.000E+00 | 0.000E+00 |
| $a_4$ | 1.427E-03 | -5.876E-03 | 5.046E-03 | -2.766E-02 | -3.788E-02 |
| $a_6$ | 1.128E-03 | -5.156E-03 | -4.761E-03 | 4.477E-03 | 5.121E-03 |
| $a_8$ | -3.271E-04 | 0.000E+00 | 3.067E-04 | -2.819E-04 | -3.907E-04 |
| $a_{10}$ | 1.999E-04 | 0.000E+00 | 0.000E+00 | 0.000E+00 | 0.000E+00 |
| $a_{12}$ | | | | | |

FIG. 29

| f(Focus)= 2.513mm, HFOV(Half angular field of view)= 48.81deg., Fno=2.00 | | | | | | | |
|---|---|---|---|---|---|---|---|
| Surface # | | Radius | Thickness | Refractive index | Abbe number | Material | Focus |
| - | Object | ∞ | ∞ | | | | |
| 811 | 1st lens element | 13.372 | 0.800 | 1.535 | 56.114 | plastic | -4.632 |
| 812 | | 2.048 | 2.488 | | | | |
| 821 | 2nd lens element | 6.315 | 0.500 | 1.535 | 56.114 | plastic | -14.704 |
| 822 | | 3.407 | 1.664 | | | | |
| 831 | 3rd lens element | 65.869 | 1.712 | 1.535 | 56.114 | plastic | 6.650 |
| 832 | | -3.730 | 0.150 | | | | |
| 800 | Aperture stop | ∞ | -0.025 | | | | |
| 841 | 4th lens element | 10.107 | 1.200 | 1.757 | 49.624 | glass | 13.349 |
| 842 | | ∞ | 5.005 | | | | |
| 851 | 5th lens element | 8.775 | 1.596 | 1.535 | 56.114 | plastic | 5.017 |
| 852 | | -3.626 | 0.143 | | | | |
| 861 | 6th lens element | 12.852 | 1.073 | 1.535 | 56.114 | plastic | -13.788 |
| 862 | | 4.552 | 0.800 | | | | |
| 871 | filter | ∞ | 0.300 | | | | |
| 872 | | ∞ | 0.261 | | | | |
| 880 | Image plane | ∞ | -0.008 | | | | |

FIG. 32

| Aspherical parameters | | | | | |
|---|---|---|---|---|---|
| Surface # | 811 | 812 | 821 | 822 | 831 |
| K | 0.000E+00 | -3.846E-01 | 0.000E+00 | 0.000E+00 | 3.507E+02 |
| $a_4$ | 8.812E-04 | -7.460E-03 | -2.061E-02 | -4.997E-03 | 9.822E-03 |
| $a_6$ | 4.889E-05 | 0.000E+00 | 0.000E+00 | 1.418E-03 | 1.575E-03 |
| $a_8$ | 0.000E+00 | 0.000E+00 | 0.000E+00 | 1.585E-04 | -1.429E-04 |
| $a_{10}$ | 0.000E+00 | 0.000E+00 | 0.000E+00 | 0.000E+00 | 5.066E-05 |
| $a_{12}$ | | | | | |
| Surface # | 832 | 851 | 852 | 861 | 862 |
| K | 0.000E+00 | 0.000E+00 | 0.000E+00 | 0.000E+00 | 0.000E+00 |
| $a_4$ | 2.460E-03 | 5.095E-04 | 1.440E-02 | -1.823E-02 | -3.877E-02 |
| $a_6$ | 2.271E-03 | -9.319E-04 | -1.483E-03 | 2.498E-03 | 4.372E-03 |
| $a_8$ | -8.050E-04 | 0.000E+00 | 7.062E-05 | -7.764E-05 | -1.698E-04 |
| $a_{10}$ | 1.999E-04 | 0.000E+00 | 0.000E+00 | 0.000E+00 | 0.000E+00 |
| $a_{12}$ | | | | | |

FIG. 33

| Embodiment | 1st Embodiment | 2nd Embodiment | 3rd Embodiment | 4th Embodiment | 5th Embodiment | 6th Embodiment | 7th Embodiment | 8th Embodiment |
|---|---|---|---|---|---|---|---|---|
| T1 | 0.800 | 0.800 | 0.800 | 0.800 | 0.800 | 0.800 | 0.800 | 0.800 |
| G12 | 0.549 | 1.690 | 0.313 | 2.337 | 0.972 | 1.511 | 2.500 | 2.488 |
| T2 | 1.695 | 0.500 | 1.391 | 0.751 | 1.475 | 1.507 | 0.668 | 0.500 |
| G23 | 1.093 | 1.290 | 1.673 | 1.046 | 2.079 | 1.177 | 0.988 | 1.664 |
| T3 | 0.958 | 0.888 | 0.703 | 1.425 | 1.170 | 0.854 | 1.600 | 1.712 |
| G34 | 0.109 | 0.039 | 0.313 | 0.102 | 0.084 | 0.100 | 0.122 | 0.125 |
| T4 | 1.204 | 1.211 | 1.214 | 1.200 | 1.200 | 1.200 | 4.808 | 1.200 |
| G45 | 0.976 | 0.493 | 1.683 | 0.909 | 2.573 | 0.477 | 0.808 | 5.005 |
| T5 | 0.644 | 0.640 | 0.610 | 0.647 | 0.995 | 0.669 | 0.900 | 1.596 |
| G56 | 0.407 | 2.369 | 0.172 | 0.120 | 1.429 | 1.531 | 0.190 | 0.143 |
| T6 | 1.293 | 0.700 | 1.371 | 0.900 | 0.700 | 0.700 | 0.700 | 1.073 |
| BFL | 1.709 | 1.379 | 1.467 | 2.727 | 1.260 | 1.473 | 1.624 | 1.353 |
| EFL | 2.293 | 2.569 | 3.128 | 2.374 | 3.193 | 2.297 | 2.525 | 2.513 |
| ALT | 6.594 | 4.739 | 6.089 | 5.723 | 6.340 | 5.730 | 9.476 | 6.881 |
| AAG | 3.134 | 5.881 | 4.154 | 4.514 | 7.137 | 4.796 | 4.608 | 9.425 |
| TTL | 11.437 | 11.999 | 11.710 | 12.964 | 14.737 | 11.999 | 15.708 | 17.659 |
| EFL/G12 | 4.177 | 1.520 | 9.994 | 1.016 | 3.285 | 1.520 | 1.010 | 1.010 |
| T3/G56 | 2.354 | 0.375 | 4.087 | 11.875 | 0.819 | 0.558 | 8.421 | 11.972 |
| ALT/AAG | 2.104 | 0.806 | 1.466 | 1.268 | 0.888 | 1.195 | 2.056 | 0.730 |
| T6/G56 | 3.177 | 0.295 | 7.971 | 7.500 | 0.490 | 0.457 | 3.684 | 7.503 |
| BFL/G45 | 1.751 | 2.797 | 0.872 | 3.000 | 0.490 | 3.088 | 2.010 | 0.270 |
| EFL/G23 | 2.098 | 1.991 | 1.870 | 2.270 | 1.536 | 1.952 | 2.556 | 0.813 |
| BFL/G56 | 4.199 | 0.582 | 8.529 | 22.725 | 0.882 | 0.962 | 8.547 | 9.462 |
| ALT/G45 | 6.756 | 9.613 | 3.618 | 6.296 | 2.464 | 12.013 | 11.728 | 1.375 |
| T4/T1 | 1.505 | 1.514 | 1.518 | 1.500 | 1.500 | 1.500 | 6.010 | 1.500 |
| ALT/G56 | 16.201 | 2.000 | 35.401 | 47.692 | 4.437 | 3.743 | 49.874 | 48.119 |
| AAG/EFL | 1.367 | 2.289 | 1.328 | 1.901 | 2.235 | 2.088 | 1.825 | 3.750 |
| G45/T1 | 1.220 | 0.616 | 2.104 | 1.136 | 3.216 | 0.596 | 1.010 | 6.256 |
| G45/T2 | 0.576 | 0.986 | 1.210 | 1.210 | 1.744 | 0.317 | 1.210 | 10.010 |
| T6/G45 | 1.325 | 1.420 | 0.815 | 0.990 | 0.272 | 1.468 | 0.866 | 0.214 |

FIG. 34

CAMERA DEVICE AND OPTICAL IMAGING LENS THEREOF

INCORPORATION BY REFERENCE

This application claims priority from R.O.C. Patent Application No. 102147542, filed on Dec. 20, 2013, the contents of which are hereby incorporated by reference in their entirety for all purposes.

TECHNICAL FIELD

The present invention relates to a camera device and an optical imaging lens thereof, and particularly, relates to a camera device applying an optical imaging lens having six lens elements and an optical imaging lens thereof.

BACKGROUND

Recently, small sized photography modules are applied in the devices not just mobile devices, such as cell phones, but interactive devices, such as gaming machines, video game consoles, handhold game console, etc., environmental monitors, video devices, monitor devices on motor vehicles, such as event data recorders, reversing camera systems mounted, etc. However, for achieving better imaging quality for simulating the scenes in the game or presenting the details in the recorded frames better, these devices require for a wide shot angle, clear night vision and small f-number value, each of which come to one of the chief development goals of the optical imaging lens installed therein.

The wavelength of the infrared ray exceeds 700 nm which is not sensed by human eyes, therefore the sensors operated with infrared ray used in the interactive devices for sensing the action of users do not arouse notice of users, but meanwhile, has several advantages, such as few cost, anti-interference, low power consumption, etc. According to R.O.C. Patent No. 201111828 disclosed an optical imaging lens constructed with an optical imaging lens having six lens elements for sensing the image of the infrared ray, only about 35 degrees of HFOV is provided.

Therefore, there is needed to develop optical imaging lens which is capable to place with six lens elements therein, with a wide view angle, low cost, while also having good optical characters and image quality.

SUMMARY

One aspect of the present invention is to provide a camera device and an optical imaging lens thereof. With controlling the convex or concave shape of the surfaces, the shot angle of the optical imaging lens is broadened and meanwhile the good optical characters are sustained.

In an exemplary embodiment, an optical imaging lens comprises, sequentially from an object side to an image side along an optical axis, comprises a first lens element, a second lens element, a third lens element, a fourth lens element, a fifth lens element and a sixth lens element, each of the first, second, third, fourth, fifth and sixth lens elements having refracting power, an object-side surface facing toward the object side and an image-side surface facing toward the image side, wherein: the first lens element has negative refracting power; the image-side surface of the second lens element comprises a concave portion in a vicinity of a periphery of the second lens element; the object-side surface of the third lens element comprises a convex portion in a vicinity of the optical axis; the object-side surface of the fourth lens element comprises a convex portion in a vicinity of a periphery of the fourth lens element; the image-side surface of the fifth lens element comprises a convex portion in a vicinity of the optical axis; the image-side surface of the sixth lens element which is constructed by plastic material comprises a concave portion in a vicinity of the optical axis; and the optical imaging lens comprises only these six lens elements having refracting power.

In another exemplary embodiment, other equation(s), such as those relating to the ratio among parameters could be taken into consideration. For example, an air gap between the first lens element and the second lens element along the optical axis, G12, and a focal length of the optical imaging lens, EFL, could be controlled to satisfy the equation as follows:

$1 \leq EFL/G12$        Equation (1); or

A central thickness of the third lens element along the optical axis, T3, and an air gap between the fifth lens element and the sixth lens element along the optical axis, G56, could be controlled to satisfy the equation as follows:

$T3/G56 \leq 12$        Equation (2); or

The sum of the thickness of all six lens elements along the optical axis, ALT, and the sum of all five air gaps from the first lens element to the sixth lens element along the optical axis, AAG, could be controlled to satisfy the equation as follows:

$ALT/AAG \leq 50$        Equation (3); or

G56 and a central thickness of the sixth lens element along the optical axis, T6, could be controlled to satisfy the equation as follows:

$T6/G56 \leq 8$        Equation (4); or

An air gap between the fourth lens element and the fifth lens element along the optical axis, G45, and a back focal length of the optical imaging lens, i.e. the distance from the image-side surface of the sixth lens element to an image plane on the optical axis or BFL, could be controlled to satisfy the equation as follows:

$BFL/G45 \leq 8$        Equation (5); or

EFL and an air gap between the second lens element and the third lens element along the optical axis, G23, could be controlled to satisfy the equation as follows:

$1.5 \leq EFL/G23$        Equation (6); or

G56 and BFL could be controlled to satisfy the equation as follows:

$BFL/G56 \leq 35$        Equation (7); or

G45 and ALT could be controlled to satisfy the equation as follows:

$ALT/G45 \leq 13$        Equation (8); or

A central thickness of the first lens element along the optical axis, T1, and a central thickness of the fourth lens element along the optical axis, T4, could be controlled to satisfy the equation as follows:

$1 \leq T4/T1$        Equation (9); or

G56 and ALT could be controlled to satisfy the equation as follows:

$ALT/G56 \leq 50$        Equation (10); or

AAG and EFL could be controlled to satisfy the equation as follows:

$AAG/EFL \leq 20$        Equation (11); or

T1 and G45 could be controlled to satisfy the equation as follows:

$1 \leq G45/T1$      Equation (12); or

G45 and a central thickness of the second lens element along the optical axis, T2, could be controlled to satisfy the equation as follows:

$1.2 \leq G45/T2$      Equation (13); or

T6 and G45 could be controlled to satisfy the equation as follows:

$T6/G45 \leq 1$      Equation (14).

Aforesaid exemplary embodiments are not limited and could be selectively incorporated in other embodiments described herein.

In some exemplary embodiments, more details about the convex or concave surface structure, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

In another exemplary embodiment, a camera device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the camera device and the optical imaging lens thereof in exemplary embodiments achieve good optical characters and effectively broaden the shot angle of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 34 is a table for the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 of all eight example embodiments.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
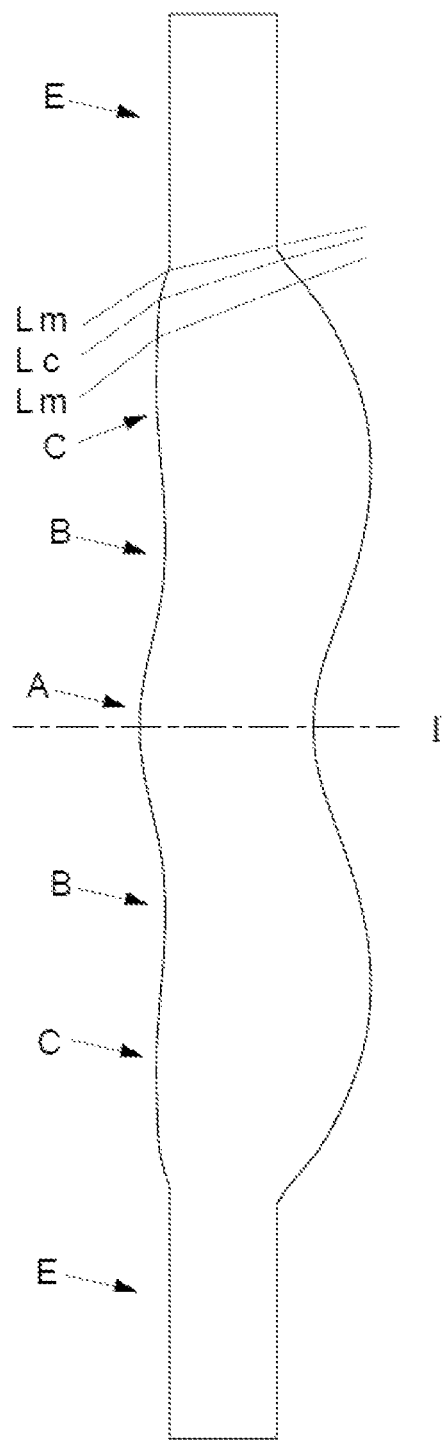
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element, a fifth lens element and a sixth lens element, each of the lens elements comprises refracting power, an object-side surface facing toward an object side and an image-side surface facing toward an image side. These lens elements may be arranged sequentially from the object side to the image side along an optical axis, and example embodiments of the lens as a whole may comprise only the six lens elements having refracting power. Through controlling the convex or concave shape of the surfaces and/or the refraction power of the lens element(s), the camera device and the optical imaging lens thereof in exemplary embodiments achieve good optical characters and effectively broaden the shot angle of the optical imaging lens. In an example embodiment: the first lens element has negative refracting power; the image-side surface of the second lens element comprises a concave portion in a vicinity of a periphery of the second lens element; the object-side surface of the third lens element comprises a convex portion in a vicinity of the optical axis; the object-side surface of the fourth lens element comprises a convex portion in a vicinity of a periphery of the fourth lens element; the image-side surface of the fifth lens element comprises a convex portion in a vicinity of the optical axis; the image-side surface of the sixth lens element which is constructed by plastic material comprises a concave portion in a vicinity of the optical axis.

Preferably, the lens elements are designed in light of the optical characteristics and the length of the optical imaging lens. For example, the first lens element having negative refracting power facilitates the light with large incident angle entering into the optical imaging lens. Combined this with the concave portions in a vicinity of a periphery of the second lens element formed on the image-side surface thereof, the convex portion in a vicinity of the optical axis formed on the object-side surface of the third lens element, the convex portion in a vicinity of a periphery of the fourth lens element formed on the object-side surface thereof, the convex portion in a vicinity of the optical axis formed on the image-side surface of the fifth lens element and the concave portion in a vicinity of the optical axis formed on the object-side surface of the sixth lens element, the aberration of the optical imaging lens could be further adjusted and meanwhile good optical performance could be sustained.

Further, the sixth lens element constructed by plastic material could lower both the weight and cost.

In another exemplary embodiment, some equation(s) of parameters, such as those relating to the ratio among parameters could be taken into consideration. For example, an air gap between the first lens element and the second lens element along the optical axis, G12, and a focal length of the optical imaging lens, EFL, could be controlled to satisfy the equation as follows:

$$1 \leq EFL/G12 \quad \text{Equation (1); or}$$

A central thickness of the third lens element along the optical axis, T3, and an air gap between the fifth lens element and the sixth lens element along the optical axis, G56, could be controlled to satisfy the equation as follows:

$$T3/G56 \leq 12 \quad \text{Equation (2); or}$$

The sum of the thickness of all six lens elements along the optical axis, ALT, and the sum of all five air gaps from the first lens element to the sixth lens element along the optical axis, AAG, could be controlled to satisfy the equation as follows:

$$ALT/AAG \leq 50 \quad \text{Equation (3); or}$$

G56 and a central thickness of the sixth lens element along the optical axis, T6, could be controlled to satisfy the equation as follows:

$$T6/G56 \leq 8 \quad \text{Equation (4); or}$$

An air gap between the fourth lens element and the fifth lens element along the optical axis, G45, and a back focal length of the optical imaging lens, i.e. the distance from the image-side surface of the sixth lens element to an image plane on the optical axis or BFL, could be controlled to satisfy the equation as follows:

$$BFL/G45 \leq 8 \quad \text{Equation (5); or}$$

EFL and an air gap between the second lens element and the third lens element along the optical axis, G23, could be controlled to satisfy the equation as follows:

$$1.5 \leq EFL/G23 \quad \text{Equation (6); or}$$

G56 and BFL could be controlled to satisfy the equation as follows:

$$BFL/G56 \leq 35 \quad \text{Equation (7); or}$$

G45 and ALT could be controlled to satisfy the equation as follows:

$$ALT/G45 \leq 13 \quad \text{Equation (8); or}$$

A central thickness of the first lens element along the optical axis, T1, and a central thickness of the fourth lens element along the optical axis, T4, could be controlled to satisfy the equation as follows:

$$1 \leq T4/T1 \quad \text{Equation (9); or}$$

G56 and ALT could be controlled to satisfy the equation as follows:

$$ALT/G56 \leq 50 \quad \text{Equation (10); or}$$

AAG and EFL could be controlled to satisfy the equation as follows:

$$AAG/EFL \leq 20 \quad \text{Equation (11); or}$$

T1 and G45 could be controlled to satisfy the equation as follows:

$$1 \leq G45/T1 \quad \text{Equation (12); or}$$

G45 and a central thickness of the second lens element along the optical axis, T2, could be controlled to satisfy the equation as follows:

$$1.2 \leq G45/T2 \quad \text{Equation (13); or}$$

T6 and G45 could be controlled to satisfy the equation as follows:

$$T6/G45 \leq 1 \quad \text{Equation (14).}$$

Aforesaid exemplary embodiments are not limited and could be selectively incorporated in other embodiments described herein.

Reference is now made to Equations (1) and (6). Considering the aberration and distortion are getting worse when achieving great view angle and focusing image light in a short distance and the characteristics of the optical imaging lens of the present invention in infrared ray, which reflecting angle is greater for the wavelength of which is longer compared with that of visible light, the present invention weigh more on the requirement for focusing light on the same plane, i.e. the image plane, to provide good optical characters. Here the value of EFL/G12 is suggested to be within 1~12, and EFL/G23 is suggested to be within 1.5~3. Therefore, a good arrangement of the path of the imaging light and a good optical quality are attained.

Reference is now made to Equation (2). Considering that the thickness of the third lens element is open to a comparative thick thickness for the sake of the convex portion in a vicinity of the optical axis on the object-side thereof and the air gap between the fifth and sixth lens elements is open to a comparative narrow gap for the sake of the convex portion in a vicinity of the optical axis on the image-side surface of the fifth lens element, here the value of T3/G56 is suggested to satisfy Equation (2) for proper configuration which is able to avoid dislike problems, such as an excessive length of the optical imaging lens or overwhelming difficulty faced in the assembly process, and preferably, it is suggested to be within 0.1~12.

Reference is now made to Equation (3). Considering that achieving the wide shot angle requires for comparative greater air gap for passing light there between onto a proper level when entering the adjacent lens element, the value of AAG requires for a proper value for sustaining good image quality. Here, the value of ALT/AAG is suggested for an upper limit to satisfy Equation (3), preferably, it is suggested to be within 0.5~50, and more preferably, it is suggested to be within 0.5~3.

Reference is now made to Equations (4) and (14). Considering that the values of G56 and G45 require for a proper value for facilitating assembly process, the thickness of the sixth lens element is comparatively open to variation. The values of T6/G56 and T6/G45 are suggested for an upper limit to satisfy Equations (4) and (14) for providing good image quality as well as facilitating assembly process. Here, preferably, the values of T6/G56 is suggested to be within 0.1~8, and the values of T6/G45 is suggested to be within 0.1~1.

Reference is now made to Equations (5) and (7). Considering that the values of G56 and G45 require for a proper value for facilitating assembly process, and the value of BFL requires for a proper value for receiving a filtering unit. When the values of BFL/G45 and BFL/G56 satisfy Equations (5) and (7), the values of BFL, G45 and G56 are in a proper configuration. Here, preferably, the values of BFL/G45 is suggested to be within 0.1~8, the values of BFL/G56 is suggested to be within 0.1~35, and more preferably, it is suggested to be within 0.1~28.

Reference is now made to Equation (9). Considering that the effective diameter of the first lens element is comparative greater and that of the fourth lens element is smaller and these make the first lens element open to a thick thickness and the fourth lens element open to a thin thickness, the value of T4/T1 is suggested to satisfy Equation (9) to limit the thickness of the first lens element in a proper range and allow the values of T1 and T4 in a proper configuration. Here, preferably, the values of T4/T1 is suggested to be within 1~7.

Reference is now made to Equations (8) and (10). As mentioned above, considering that the values of G56 and G45 require for a proper value for facilitating assembly process, and the value of ALT requires less limitations. When the values of ALT/G45 and ALT/G56 satisfy Equations (8) and (10), the values of ALT, G45 and G56 are in a proper configuration. Here, preferably, the values of ALT/G56 is suggested to be within 1~50, and the values of ALT/G45 is suggested to be within 0.8~13.

Reference is now made to Equation (11). Considering that the values of EFL, HFOV and each air gaps interact each other, the value of AAG/EFL is suggested to satisfy Equation (11) to achieving great view angle and also good image quality. Here, preferably, the values of AAG/EFL is suggested to be within 0.8~20, and more preferably, it is suggested to be within 0.8~6.

Reference is now made to Equations (12) and (13). As mentioned above, considering that the value of G45 requires for a proper value for facilitating assembly process, and the value of T1 or T2 requires less limitations comparing with G45. When the values of G45/T1 and G45/T2 satisfy Equations (12) and (13), the optical performance of the optical imaging lens is better. Here, preferably, the values of G45/T1 is suggested to be within 1~7, and the values of G45/T2 is suggested to be within 1.2~12.

When implementing example embodiments, more details about the convex or concave surface, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

Figure 2:
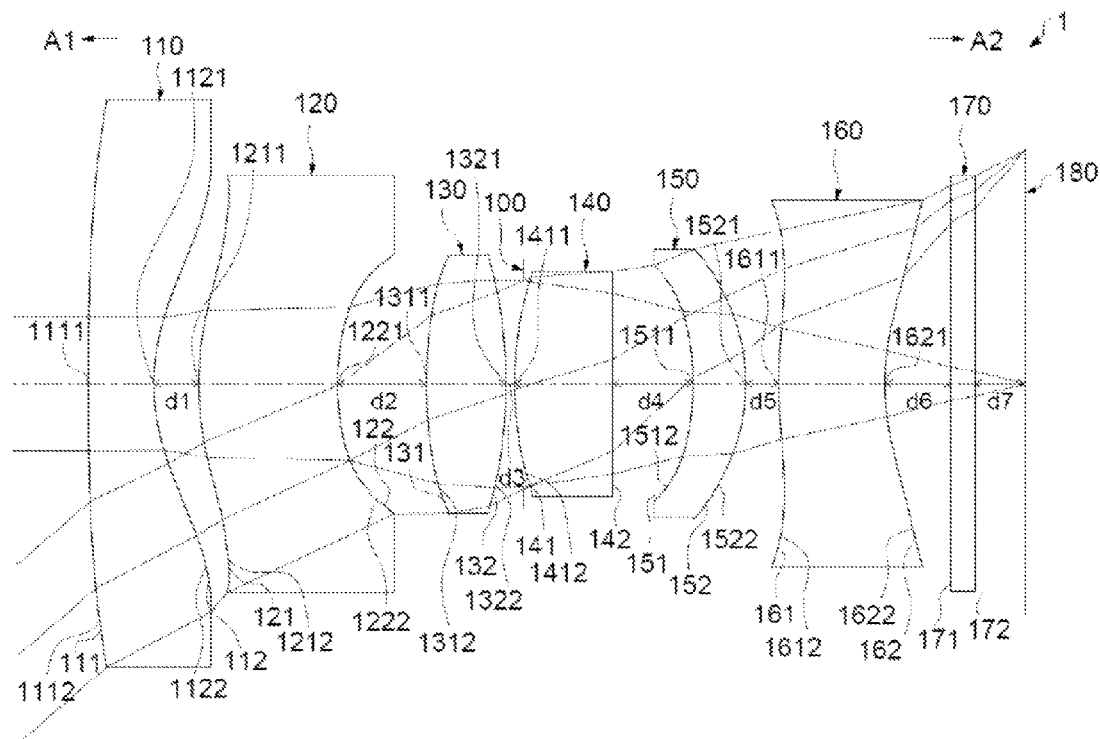
FIG. 2 is a cross-sectional view of a first embodiment of an optical imaging lens having six lens elements according to the present disclosure.
Figure 3:
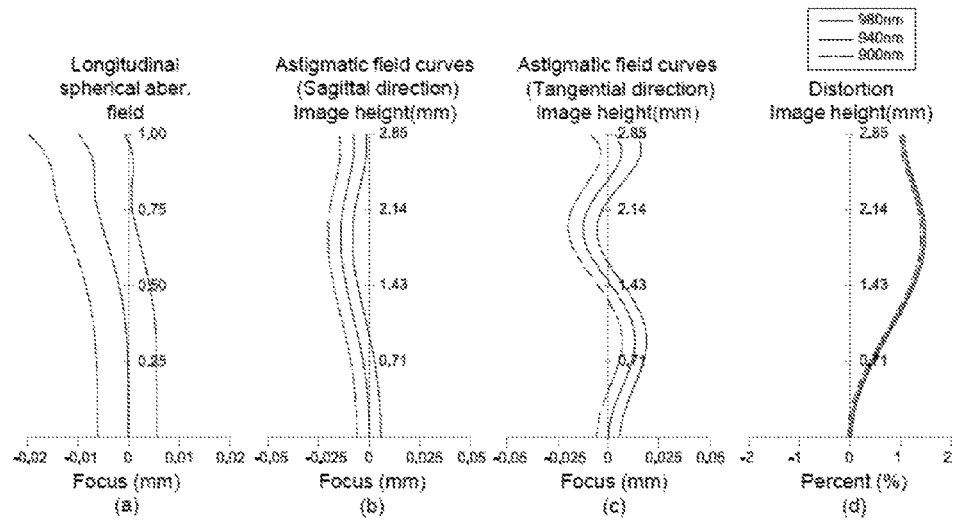
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a broadened shot angle. Reference is now made to FIGS. 2-5. FIG. 2 illustrates an example cross-sectional view of an optical imaging lens 1 having six lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment, in which a focal length of the optical imaging lens is labelled as "f". FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, a second lens element 120, a third lens element 130, an aperture stop 100, a fourth lens element 140, a fifth lens element 150 and a sixth lens element 160. A filtering unit 170 and an image plane 180 of an image sensor are positioned at the image side A2 of the optical lens 1. Each of the first, second, third, fourth, fifth and sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. The example embodiment of the filtering unit 170 positioned between the sixth lens element 160 and an image plane 180. The filtering unit 170 selectively absorbs light with specific wavelength from the light passing optical imaging lens 1. For example, visible light is absorbed, and this will prohibit the visible light from producing an image on the image plane 180.

Exemplary embodiments of the optical imaging lens 1, wherein the fourth lens element 140 which may be constructed by glass material, and the first, second, third, fifth and sixth lens elements 110, 120, 130, 150, 160 which may be constructed by plastic material which can help reducing the weight of the image lens, will now be described with reference to the drawings. The glass-made fourth lens element 140 can help reducing the variation of the back focal length which was affected by the operation temperature, but the fourth lens element in the present invention is not limited to be constructed by this specific material.

An example embodiment of the first lens element 110 has negative refracting power. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of a periphery of the first lens element 110.

An example embodiment of the second lens element 120 has positive refracting power. The object-side surface 121 comprises a convex portion 1211 in a vicinity of the optical axis and a concave portion 1212 in a vicinity of a periphery of the second lens element 120. The image-side surface 122 is a concave surface comprising a concave portion 1221 in a vicinity of the optical axis and a concave portion 1222 in a vicinity of a periphery of the second lens element 120.

An example embodiment of the third lens element 130 has positive refracting power. The object-side surface 131 is a convex surface comprising a convex portion 1311 in a vicinity of the optical axis and a convex portion 1312 in a vicinity of a periphery of the third lens element 130. The image-side surface 132 is a convex surface comprising a convex portion 1321 in a vicinity of the optical axis and a convex portion 1322 in a vicinity of a periphery of the third lens element 130.

An example embodiment of the fourth lens element 140 has positive refracting power. The object-side surface 141 is a convex surface comprising a convex portion 1411 in a vicinity of the optical axis and a convex portion 1412 in a vicinity of a periphery of the fourth lens element 140. The image-side surface 142 is a flat plane.

An example embodiment of the fifth lens element 150 has positive refracting power. The object-side surface 151 is a concave surface comprising a concave portion 1511 in a vicinity of the optical axis and a concave portion 1512 in a vicinity of a periphery of the fifth lens element 150. The image-side surface 152 is a convex surface comprising a convex portion 1521 in a vicinity of the optical axis and a convex portion 1522 in a vicinity of a periphery of the fifth lens element 150.

An example embodiment of the sixth lens element 160 has negative refracting power. The object-side surface 161 comprises a convex portion 1611 in a vicinity of the optical axis and a concave portion 1612 in a vicinity of a periphery of the sixth lens element 160. The image-side surface 162 is a concave surface comprising a concave portion 1621 in a vicinity of the optical axis and a concave portion 1622 in a vicinity of a periphery of the sixth lens element 160.

In example embodiments, air gaps exist between the lens elements 110, 120, 130, 140, 150, 160, the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170 and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, the air gap d5 is denoted by G56 and the sum of d1, d2, d3, d4 and d5 is denoted by AAG.

FIG. 4 depicts the optical characters of each lens elements in the optical imaging lens 1 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=0.549 (mm);
T2=1.695 (mm);
G23=1.093 (mm);
T3=0.958 (mm);
G34=0.109 (mm);
T4=1.204 (mm);
G45=0.976 (mm);
T5=0.644 (mm);
G56=0.407 (mm);
T6=1.293 (mm);
BFL=1.709 (mm);
EFL=2.293 (mm);
ALT=6.594 (mm);
AAG=3.134 (mm);
TTL=11.437 (mm);
EFL/G12=4.177;
T3/G56=2.354;
ALT/AAG=2.104;
T6/G56=3.177;
BFL/G45=1.751;
EFL/G23=2.098;
BFL/G56=4.199;
ALT/G45=6.756;
T4/T1=1.505;
ALT/G56=16.201;
AAG/EFL=1.367;
G45/T1=1.220;
G45/T2=0.576;
T6/G45=1.325.

The optical imaging lens 1 which shows that the distance from the object-side surface 111 of the first lens element 110 to the image plane 180 along the optical axis is 11.437 mm, the f-number is 2.00, and the HFOV is 40.68, is capable to provide good imaging quality.

The object-side surface 141 and the image-side surface 142 of the fourth lens element 110 which is constructed by glass material are spherical surfaces. The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130 and the object-side surface 151 and the image-side surface 152 of the fifth lens element 150, the object-side surface 161 and the image-side surface 162 of the sixth lens element 160, are all defined by the following aspherical formula:

$$Z(Y) = \frac{Y^2}{R} \Bigg/ \left( 1 + \sqrt{1 - (1+K)\frac{Y^2}{R^2}} \right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.02 mm. Therefore, the present embodiment improves the longitudinal spherical aberration with respect to different wavelengths.

As shown in FIG. 3, astigmatism aberration in the sagittal direction (b) and astigmatism aberration in the tangential direction (c). The focus variation with respect to the three wavelengths in the whole field falls within ±0.025 mm. This reflects the optical imaging lens 1 of the present embodiment eliminates aberration effectively.

As shown in FIG. 3, distortion aberration (d), which showing the variation of the distortion aberration is within ±2%.

Therefore, the optical imaging lens 1 of the present embodiment shows good optical characters to meet the requirements of the imaging quality. According to above illustration, the optical imaging lens 1 of the example embodiment, which is capable to provide 40.68 degrees of HFOV and 2.00 of f-number, indeed achieves great optical performance and the shot angle of the optical imaging lens 1 is effectively broadened.

Figure 6:
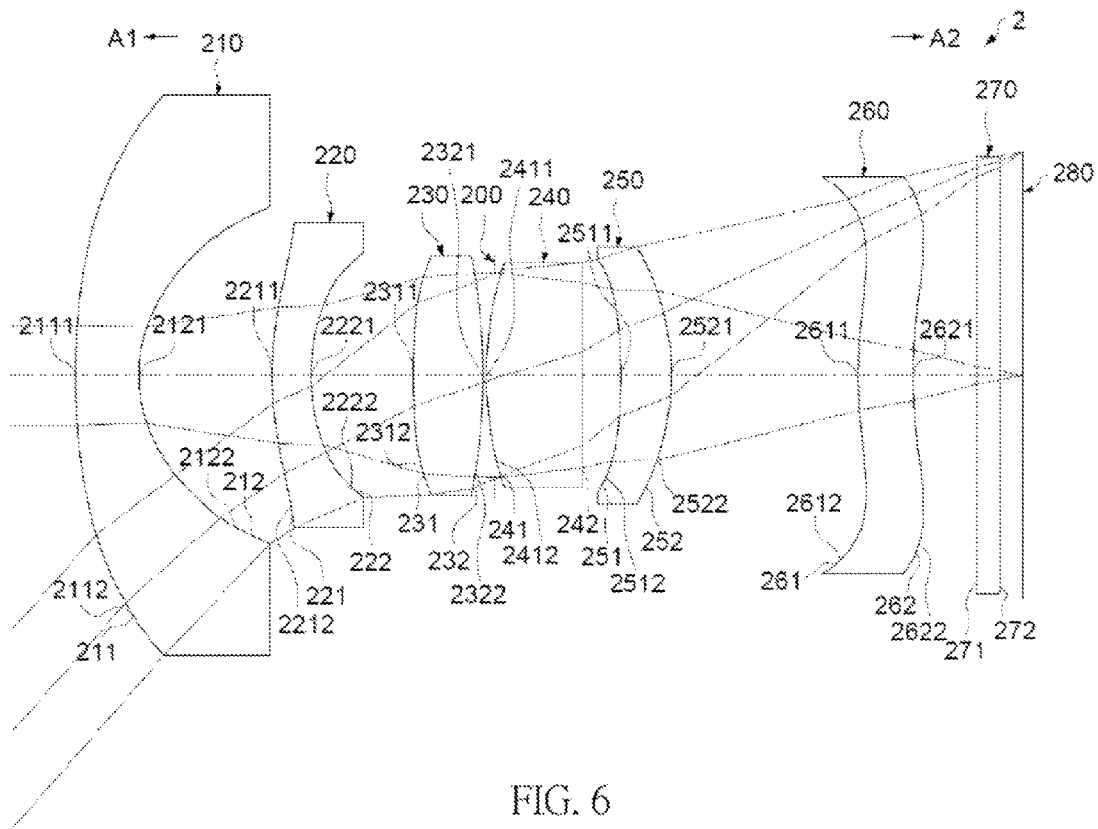
FIG. 6 is a cross-sectional view of a second embodiment of an optical imaging lens having six lens elements according to the present disclosure.
Figure 7:
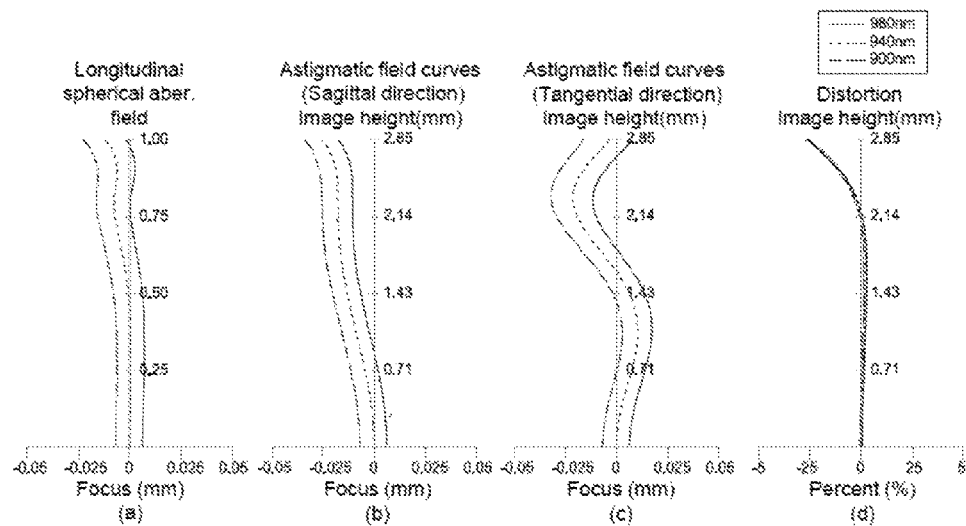
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, a second lens element 220, a third lens element 230, an aperture stop 200, a fourth lens element 240, a fifth lens element 250 and a sixth lens element 260.

The differences between the second embodiment and the first embodiment are the radius of curvature and thickness of each lens element, the distance of each air gap, the configuration of the positive/negative refracting power of the second and sixth lens elements 220, 260 and the configuration of the concave/convex shape of the object-side surface 221 and the image-side surface 262, but the configuration of the positive/negative refracting power of the first, third, fourth and fifth lens elements 210, 230, 240, 250 and configuration of the concave/convex shape of surfaces, comprising the object-side surfaces 211, 231, 241, 251, 261 facing to the object side A1 and the image-side surfaces 212, 222, 232, 242, 252 facing to the image side A2, are similar to those in the first embodiment. Specifically, the second lens element 220 has negative refracting power, the object-side surface 221 of the second lens element 220 is a convex surface, comprising a convex portion 2211 in a vicinity of the optical axis and a convex portion 2212 in a vicinity of a periphery of the second lens element 220, the sixth lens element 260 has positive refracting power, and the image-side surface 262 of the sixth lens element 260 comprises a concave portion 2621 in a vicinity of the optical axis and a convex portion 2622 in a vicinity of a periphery of the sixth lens element 260. As shown in FIG. 8, the optical characteristics of each lens elements in the optical imaging lens 2 the present embodiment, the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=1.690 (mm);
T2=0.500 (mm);
G23=1.290 (mm);
T3=0.888 (mm);
G34=0.039 (mm);
T4=1.211 (mm);
G45=0.493 (mm);
T5=0.640 (mm);
G56=2.369 (mm);
T6=0.700 (mm);
BFL=1.379 (mm);
EFL=2.569 (mm);
ALT=4.739 (mm);
AAG=5.881 (mm);
TTL=11.999 (mm);
EFL/G12=1.520;
T3/G56=0.375;
ALT/AAG=0.806;
T6/G56=0.295;
BFL/G45=2.797;
EFL/G23=1.991;
BFL/G56=0.582;
ALT/G45=9.613;
T4/T1=1.514;
ALT/G56=2.000;
AAG/EFL=2.289;
G45/T1=0.616;
G45/T2=0.986;
T6/G45=1.420.

The optical imaging lens 2 which shows that the distance from the object-side surface 211 of the first lens element 210 to the image plane 280 along the optical axis is 11.999 mm, the f-number is 2.00, and the HFOV is 48.79, is capable to provide good imaging quality.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 2 of the present embodiment, which is capable to provide 48.79 degrees of HFOV and 2.00 of f-number, indeed achieves great optical performance and the shot angle of the optical imaging lens 2 is effectively broadened.

Figure 10:
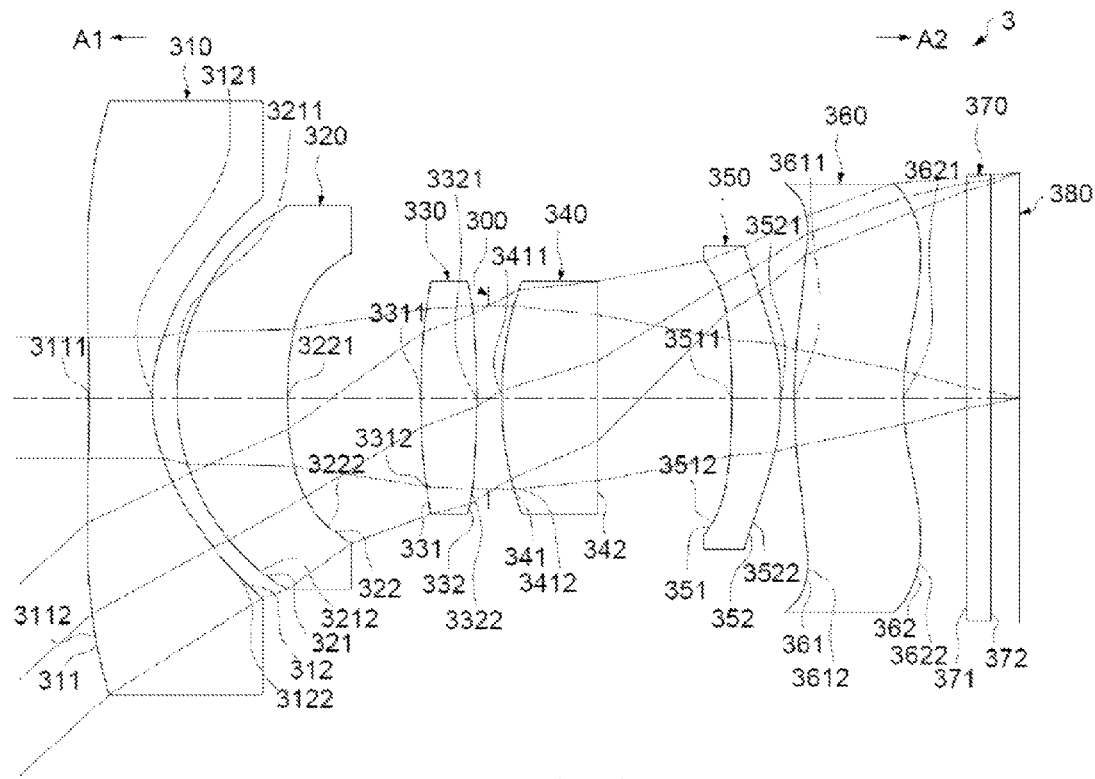
FIG. 10 is a cross-sectional view of a third embodiment of an optical imaging lens having six lens elements according to the present disclosure.
Figure 11:
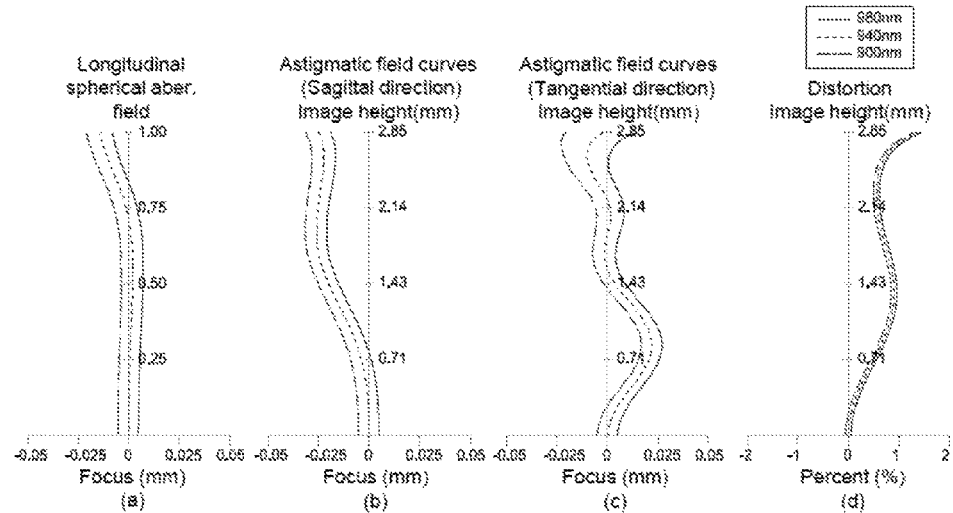
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, a second lens element 320, a third lens element 330, an aperture stop 300, a fourth lens element 340, a fifth lens element 350 and a sixth lens element 360.

The differences between the third embodiment and the first embodiment are the radius of curvature and thickness of each lens element, the distance of each air gap and the configuration of the concave/convex shape of the object-side surfaces 311, 321 and the image-side surfaces 362, but the configuration of the positive/negative refracting power of the first, second, third, fourth, fifth and sixth lens elements 310, 320, 330, 340, 350, 360 and configuration of the concave/convex shape of surfaces, comprising the object-side surfaces 331, 341, 351, 361 facing to the object side A1 and the image-side surfaces 312, 322, 332, 342, 352 facing to the image side A2, are similar to those in the first embodiment. Specifically, the object-side surface 311 of the first lens element 310 comprises a concave portion 3111 in a vicinity of the optical axis and a convex portion 3112 in a vicinity of a periphery of the first lens element 310, the object-side surface 321 of the second lens element 320 is a convex surface comprising a convex portion 3211 in a vicinity of the optical axis and a convex portion 3212 in a vicinity of a periphery of the second lens element 320, and the image-side surface 362 of the sixth lens element 360 comprises a concave portion 3621 in a vicinity of the optical axis and a convex portion 3622 in a vicinity of a periphery of the sixth lens element 360. In FIG. 12, the optical characteristics of each lens elements in the optical imaging lens 3 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=0.313 (mm);
T2=1.391 (mm);
G23=1.673 (mm);
T3=0.703 (mm);
G34=0.313 (mm);
T4=1.214 (mm);
G45=1.683 (mm);
T5=0.610 (mm);
G56=0.172 (mm);
T6=1.371 (mm);
BFL=1.467 (mm);
EFL=3.128 (mm);
ALT=6.089 (mm);
AAG=4.154 (mm);
TTL=11.710 (mm);
EFL/G12=9.994;
T3/G56=4.087;
ALT/AAG=1.466;
T6/G56=7.971;
BFL/G45=0.872;
EFL/G23=1.870;
BFL/G56=8.529;
ALT/G45=3.618;
T4/T1=1.518;
ALT/G56=35.401;
AAG/EFL=1.328;
G45/T1=2.104;
G45/T2=1.210;
T6/G45=0.815.

The optical imaging lens 3 which shows that the distance from the object-side surface 311 of the first lens element 310 to the image plane 380 along the optical axis is 11.710 mm, the f-number is 2.00, and the HFOV is 42.00, is capable to provide good imaging quality.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 3 of the present embodiment, which is capable to provide 42.00 degrees of HFOV and 2.00 of f-number, indeed achieves great optical performance and the shot angle of the optical imaging lens 3 is effectively broadened.

Figure 14:
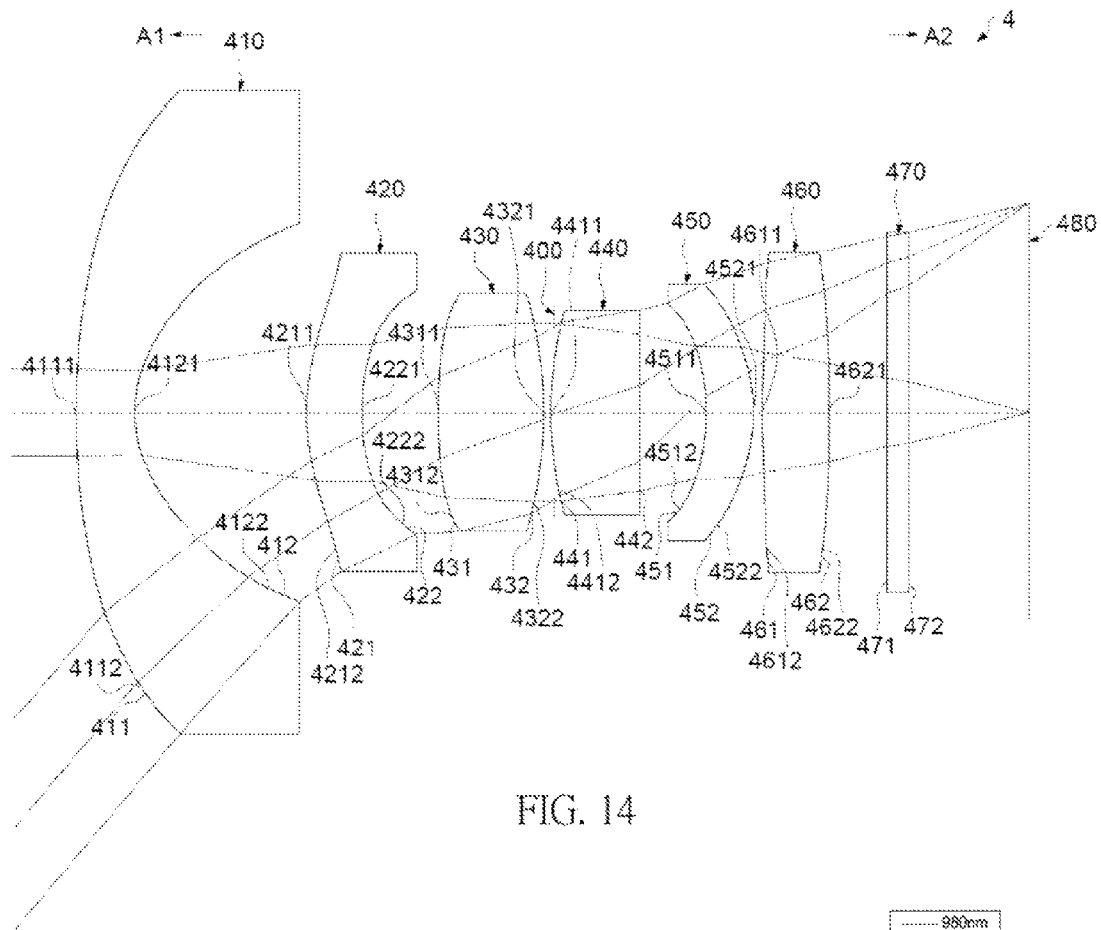
FIG. 14 is a cross-sectional view of a fourth embodiment of an optical imaging lens having six lens elements according to the present disclosure.
Figure 15:
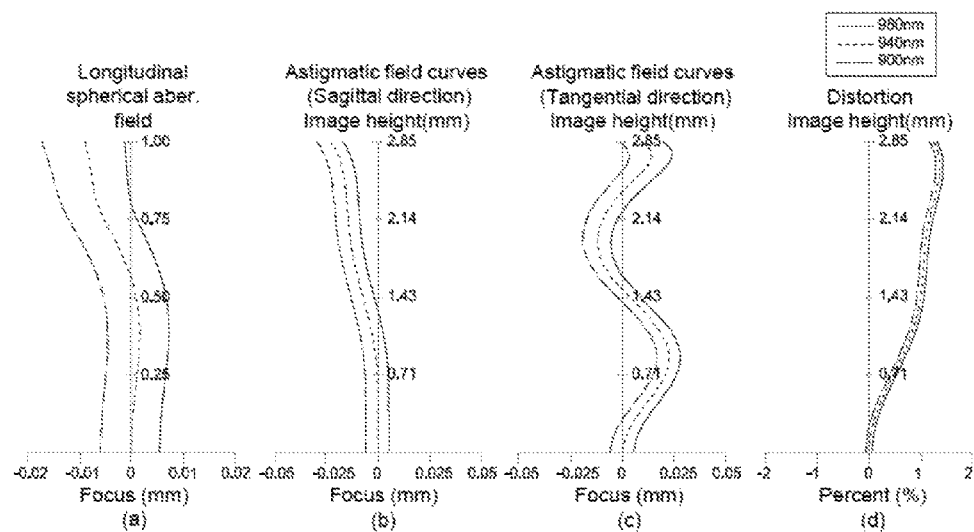
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, a second lens element 420, a third lens element 430, an aperture stop 400, a fourth lens element 440, a fifth lens element 450 and a sixth lens element 460.

The differences between the fourth embodiment and the first embodiment are the radius of curvature and thickness of each lens element, the distance of each air gap, the configuration of the positive/negative refracting power of the sixth lens element 460 and the configuration of the concave/convex shape of the object-side surfaces 421, 461 and the image-side surface 462, but the configuration of the positive/negative refracting power of the first, second, third, fourth and fifth lens elements 410, 420, 430, 440, 450 and configuration of the concave/convex shape of surfaces, comprising the object-side surfaces 411, 431, 441, 451 facing to the object side A1 and the image-side surfaces 412, 422, 432, 442, 452 facing to the image side A2, are similar to those in the first embodiment. Specifically, the object-side surface 421 of the second lens element 420 is a convex surface comprising a convex portion 4211 in a vicinity of the optical axis and a convex portion 4212 in a vicinity of a periphery of the second lens element 420, the sixth lens element 460 has positive refracting power, the object-side surface 461 of the sixth lens element 460 is a convex surface comprising a convex portion 4611 in a vicinity of the optical axis and a convex portion 4612 in a vicinity of a periphery of the sixth lens element 460, and the image-side surface 462 of the sixth lens element 460 comprises a concave portion 4621 in a vicinity of the optical axis and a convex portion 4622 in a vicinity of a periphery of the sixth lens element 460. In FIG. 16, for the optical characteristics of each lens elements in the optical imaging lens 4 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=2.337 (mm);
T2=0.751 (mm);
G23=1.046 (mm);
T3=1.425 (mm);
G34=0.102 (mm);
T4=1.200 (mm);
G45=0.909 (mm);
T5=0.647 (mm);
G56=0.120 (mm);
T6=0.900 (mm);
BFL=2.727 (mm);
EFL=2.374 (mm);
ALT=5.723 (mm);
AAG=4.514 (mm);
TTL=12.964 (mm);
EFL/G12=1.016;
T3/G56=11.875;

ALT/AAG=1.268;
T6/G56=7.500;
BFL/G45=3.000;
EFL/G23=2.270;
BFL/G56=22.725;
ALT/G45=6.296;
T4/T1=1.500;
ALT/G56=47.692;
AAG/EFL=1.901;
G45/T1=1.136;
G45/T2=1.210;
T6/G45=0.990.

The optical imaging lens 4 which shows that the distance from the object-side surface 411 of the first lens element 410 to the image plane 480 along the optical axis is 12.964 mm, the f-number is 2.00, and the HFOV is 49.93, is capable to provide good imaging quality.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 4 of the present embodiment, which is capable to provide 49.93 degrees of HFOV and 2.00 of f-number, indeed achieves great optical performance and the shot angle of the optical imaging lens 4 is effectively broadened.

Figure 18:
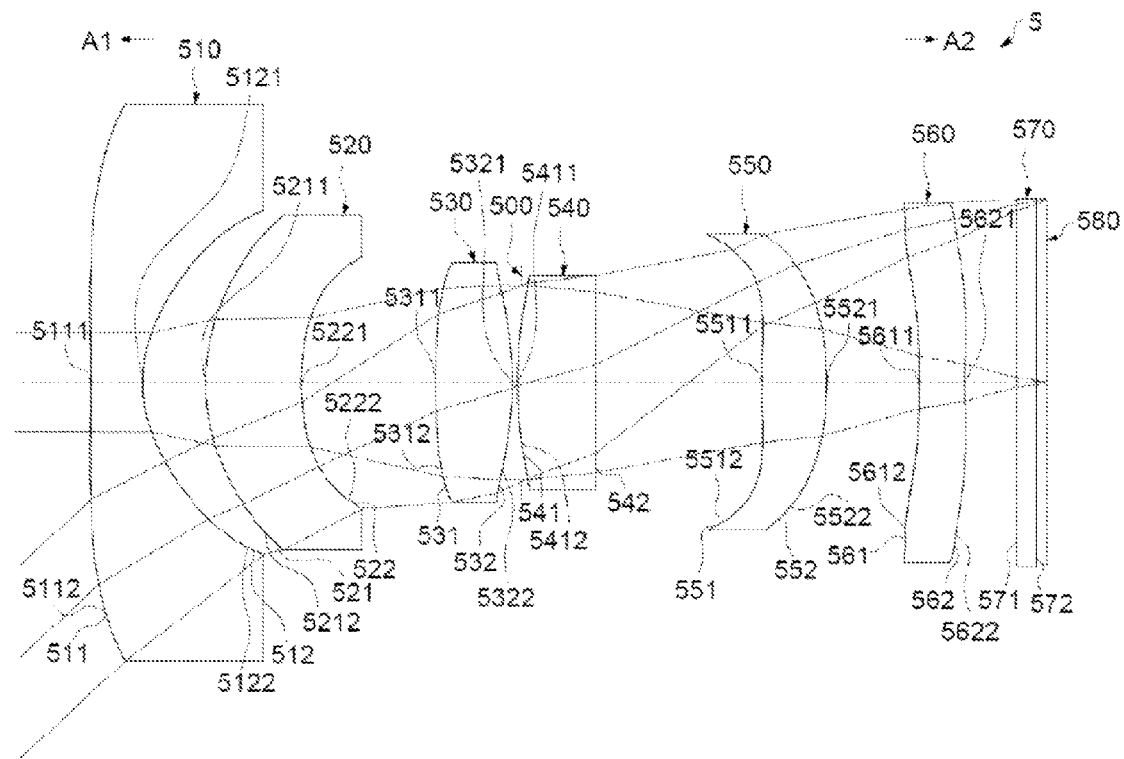
FIG. 18 is a cross-sectional view of a fifth embodiment of an optical imaging lens having six lens elements according to the present disclosure.
Figure 19:
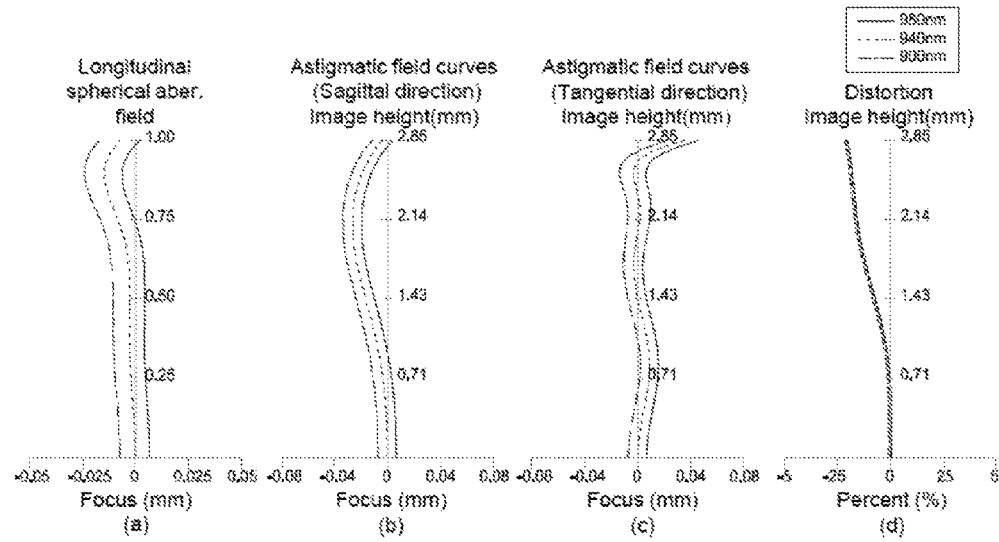
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having six lens elements of the optical imaging lens 5 according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, a second lens element 520, a third lens element 530, an aperture stop 500, a fourth lens element 540, a fifth lens element 550 and a sixth lens element 560.

The differences between the fifth embodiment and the third embodiment are the radius of curvature and thickness of each lens element, the distance of each air gap and the configuration of the concave/convex shape of the object-side surfaces 551, 561, but the configuration of the positive/negative refracting power of the first, second, third, fourth, fifth and sixth lens elements 510, 520, 530, 540, 550, 560 and configuration of the concave/convex shape of surfaces, comprising the object-side surfaces 511, 521, 531, 541 facing to the object side A1 and the image-side surfaces 512, 522, 532, 552, 562 facing to the image side A2, are similar to those in the third embodiment. Specifically, the object-side surface 551 of the fifth lens element 550 comprises a convex portion 5511 in a vicinity of the optical axis and a concave portion 5512 in a vicinity of a periphery of the fifth lens element 550, and the object-side surface 561 of the sixth lens element 560 is a concave surface comprising a concave portion 5611 in a vicinity of the optical axis and a concave portion 5612 in a vicinity of a periphery of the sixth lens element 560. In FIG. 20, the optical characteristics of each lens elements in the optical imaging lens 5 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=0.972 (mm);
T2=1.475 (mm);
G23=2.079 (mm);
T3=1.170 (mm);
G34=0.084 (mm);
T4=1.200 (mm);
G45=2.573 (mm);
T5=0.995 (mm);
G56=1.429 (mm);
T6=0.700 (mm);
BFL=1.260 (mm);
EFL=3.193 (mm);
ALT=6.340 (mm);
AAG=7.137 (mm);
TTL=14.737 (mm);
EFL/G12=3.285;
T3/G56=0.819;
ALT/AAG=0.888;
T6/G56=0.490;
BFL/G45=0.490;
EFL/G23=1.536;
BFL/G56=0.882;
ALT/G45=2.464;
T4/T1=1.500;
ALT/G56=4.437;
AAG/EFL=2.235;
G45/T1=3.216;
G45/T2=1.744;
T6/G45=0.272.

The optical imaging lens 5 which shows that the distance from the object-side surface 511 of the first lens element 510 to the image plane 580 along the optical axis is 14.737 mm, the f-number is 2.00, and the HFOV is 42.89, is capable to provide good imaging quality.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 5 of the present embodiment, which is capable to provide 42.89 degrees of HFOV and 2.00 of f-number, indeed achieves great optical performance and the shot angle of the optical imaging lens 5 is effectively broadened.

Figure 22:
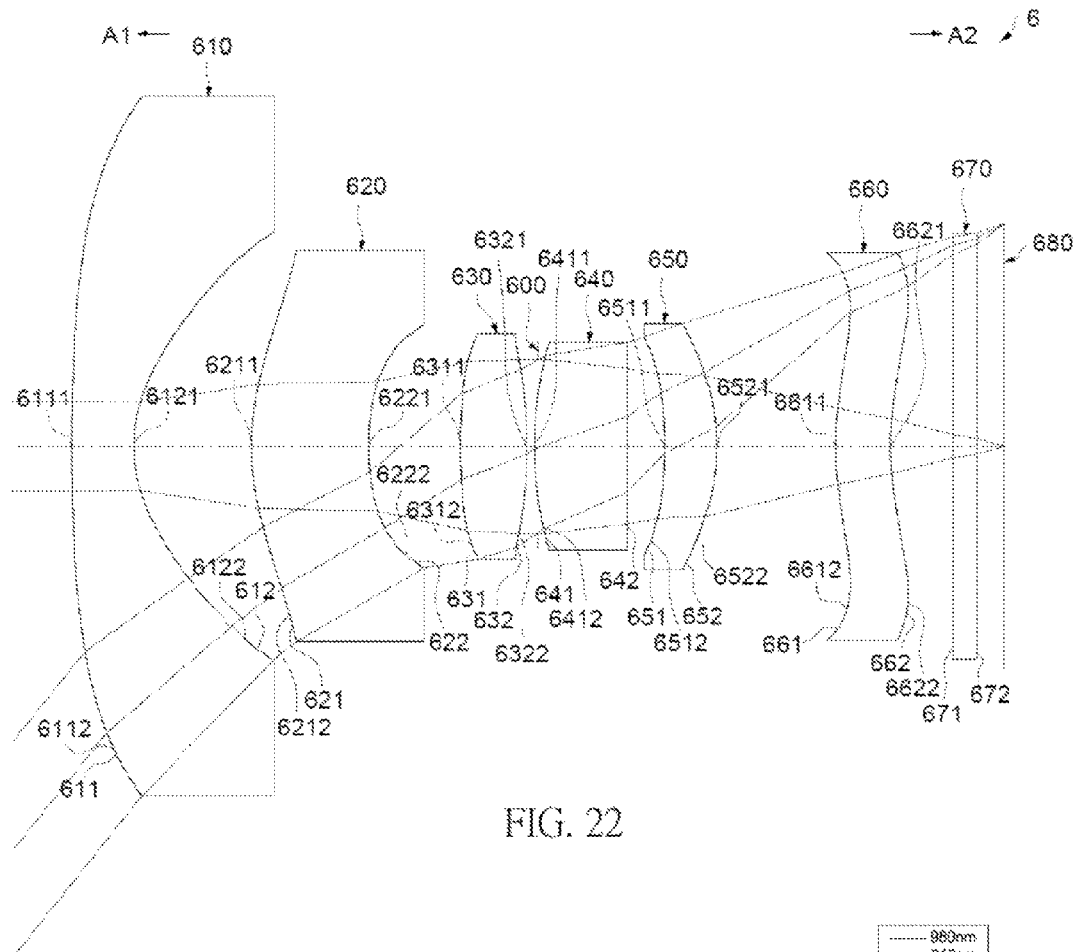
FIG. 22 is a cross-sectional view of a sixth embodiment of an optical imaging lens having six lens elements according to the present disclosure.
Figure 23:
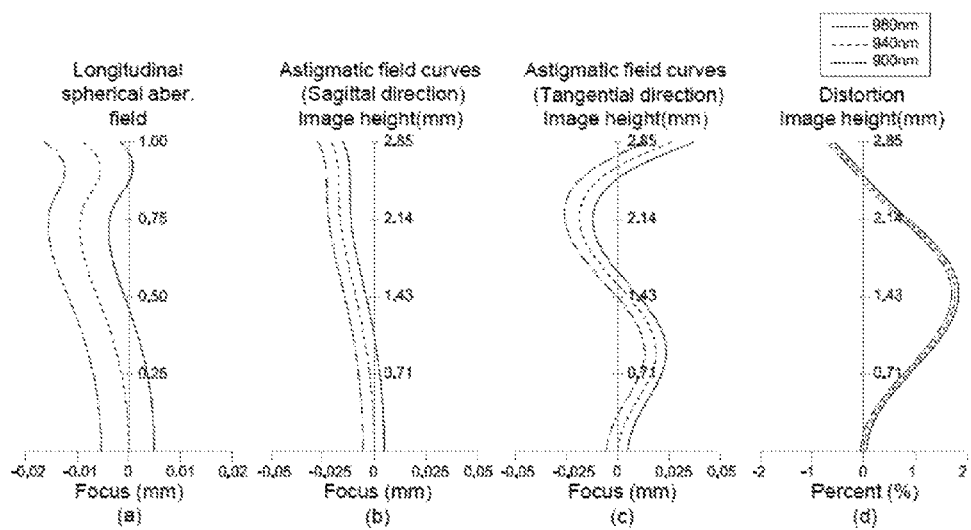
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having six lens elements of the optical imaging lens 6 according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, a second lens element 620, a third lens element 630, an aperture stop 600, a fourth lens element 640, a fifth lens element 650 and a sixth lens element 660.

The differences between the sixth embodiment and the second embodiment are the radius of curvature and thickness of each lens element, the distance of each air gap and the configuration of the positive/negative refracting power of the second and sixth lens elements 620, 660, but the configuration of the positive/negative refracting power of the first, third, fourth and fifth lens elements 610, 630, 640, 650 and configuration of the concave/convex shape of surfaces, comprising the object-side surfaces 611, 621, 631, 641, 651, 661 facing to the object side A1 and the image-side surfaces 612, 622, 632, 642, 652, 662 facing to the image side A2, are similar to those in the second embodiment. Specifically, the second lens element 620 has positive refracting power and the sixth lens element 660 has negative refracting power. As shown in FIG. 24, the optical characteristics of each lens elements in the optical imaging lens 6 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=1.511 (mm);
T2=1.507 (mm);
G23=1.177 (mm);
T3=0.854 (mm);
G34=0.100 (mm);
T4=1.200 (mm);
G45=0.477 (mm);
T5=0.669 (mm);
G56=1.531 (mm);
T6=0.700 (mm);
BFL=1.473 (mm);
EFL=2.297 (mm);
ALT=5.730 (mm);
AAG=4.796 (mm);
TTL=11.999 (mm);
EFL/G12=1.520;
T3/G56=0.558;
ALT/AAG=1.195;
T6/G56=0.457;
BFL/G45=3.088;
EFL/G23=1.952;
BFL/G56=0.962;
ALT/G45=12.013;
T4/T1=1.500;
ALT/G56=3.743;
AAG/EFL=2.088;
G45/T1=0.596;
G45/T2=0.317;
T6/G45=1.468.

The optical imaging lens 6 which shows that the distance from the object-side surface 611 of the first lens element 610 to the image plane 680 along the optical axis is 11.999 mm, the f-number is 2.00, and the HFOV is 51.38, is capable to provide good imaging quality.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 6 of the present embodiment, which is capable to provide 51.38 degrees of HFOV and 2.00 of f-number, indeed achieves great optical performance and the shot angle of the optical imaging lens 6 is effectively broadened.

Figure 26:
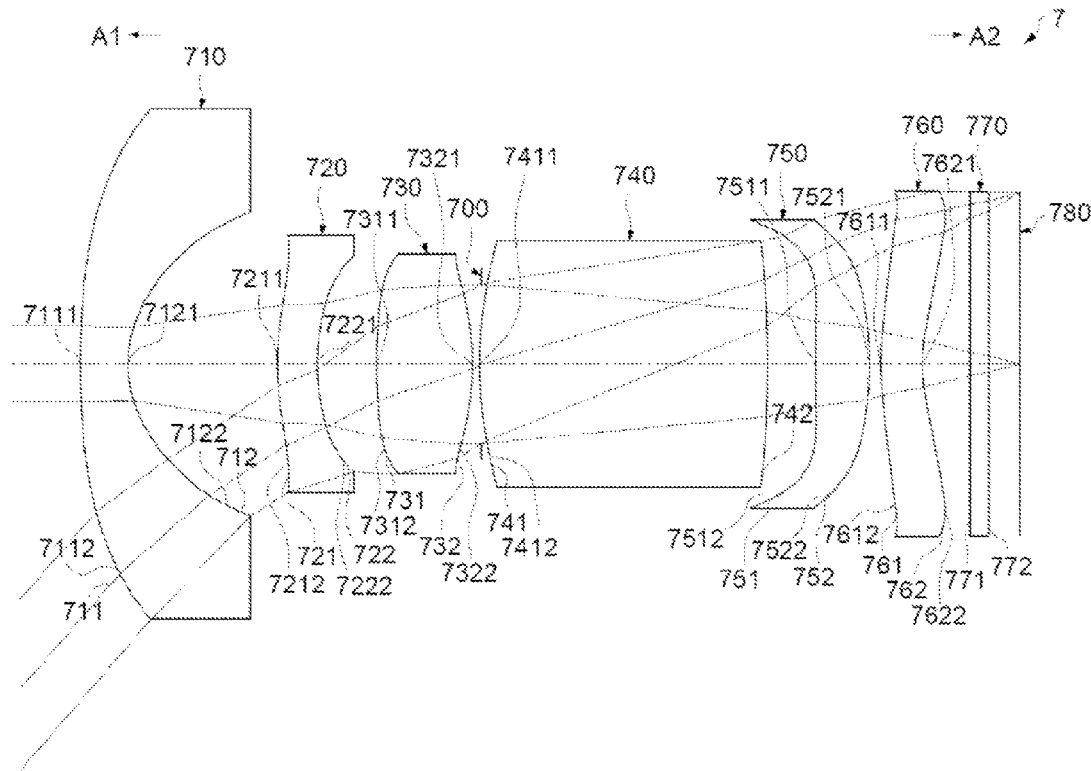
FIG. 26 is a cross-sectional view of a seventh embodiment of an optical imaging lens having six lens elements according to the present disclosure.
Figure 27:
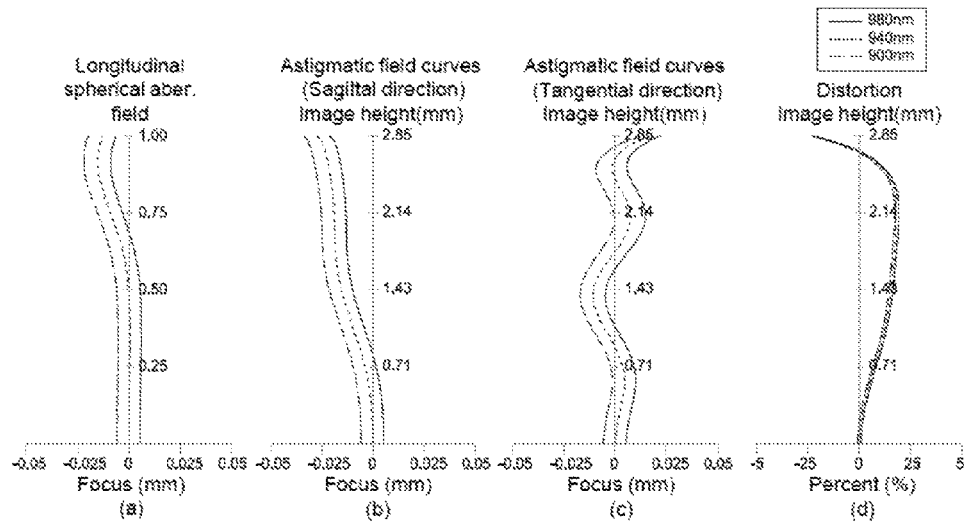
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, a second lens element 720, a third lens element 730, an aperture stop 700, a fourth lens element 740, a fifth lens element 750 and a sixth lens element 760.

The differences between the seventh embodiment and the first embodiment are the radius of curvature and thickness of each lens element, the distance of each air gap, the configuration of the positive/negative refracting power of the second lens element 720 and the configuration of the concave/convex shape of the object-side surface 751 and image-side surfaces 742 and 762, but the configuration of the positive/negative refracting power of the first, third, fourth, fifth and sixth lens elements 710, 730, 740, 750, 760 and configuration of the concave/convex shape of surfaces, comprising the object-side surfaces 711, 721, 731, 741, 761 facing to the object side A1 and the image-side surfaces 712, 722, 732, 752 facing to the image side A2, are similar to those in the first embodiment. Specifically, the second lens element 720 has negative refracting power, the image-side surface 742 of the fourth lens element 740 is a convex spherical surface, the object-side surface 751 of the fifth lens element 750 comprises a convex portion 7511 in a vicinity of the optical axis and a concave portion 7512 in a vicinity of a periphery of the fifth lens element 750, and the image-side surface 762 of the sixth lens element 760 comprises a concave portion 7621 in a vicinity of the optical axis and a convex portion 7622 in a vicinity of a periphery of the sixth lens element 760. In FIG. 28, the optical characteristics of each lens elements in the optical imaging lens 7 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=2.500 (mm);
T2=0.668 (mm);
G23=0.988 (mm);
T3=1.600 (mm);
G34=0.122 (mm);
T4=4.808 (mm);
G45=0.808 (mm);
T5=0.900 (mm);
G56=0.190 (mm);
T6=0.700 (mm);
BFL=1.624 (mm);
EFL=2.525 (mm);
ALT=9.476 (mm);
AAG=4.608 (mm);
TTL=15.708 (mm);
EFL/G12=1.010;
T3/G56=8.421;
ALT/AAG=2.056;
T6/G56=3.684;
BFL/G45=2.010;
EFL/G23=2.556;
BFL/G56=8.547;
ALT/G45=11.728;
T4/T1=6.010;
ALT/G56=49.874;
AAG/EFL=1.825;
G45/T1=1.010;
G45/T2=1.210;
T6/G45=0.866.

The optical imaging lens 7 which shows that the distance from the object-side surface 711 of the first lens element 710 to the image plane 780 along the optical axis is 15.708 mm, the f-number is 2.00, and the HFOV is 49.17, is capable to provide good imaging quality.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 7 of the present embodiment, which is capable to provide 49.17 degrees of HFOV and 2.00 of f-number, indeed achieves great optical performance and the shot angle of the optical imaging lens 7 is effectively broadened.

Figure 30:
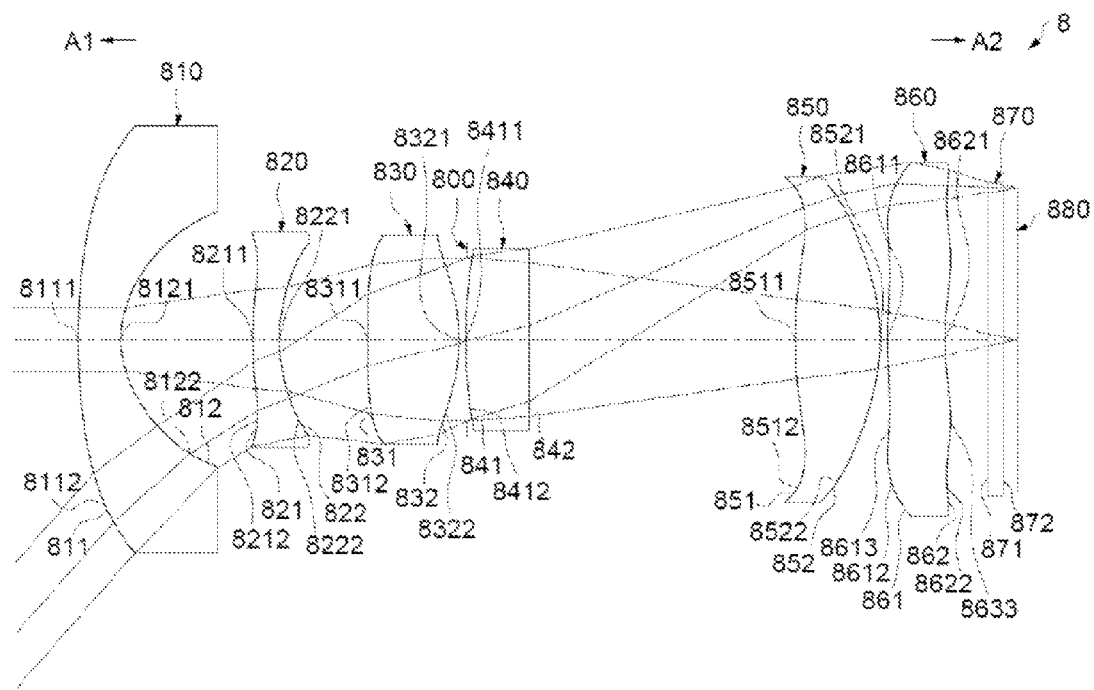
FIG. 30 is a cross-sectional view of an eighth embodiment of an optical imaging lens having six lens elements according to the present disclosure.
Figure 31:
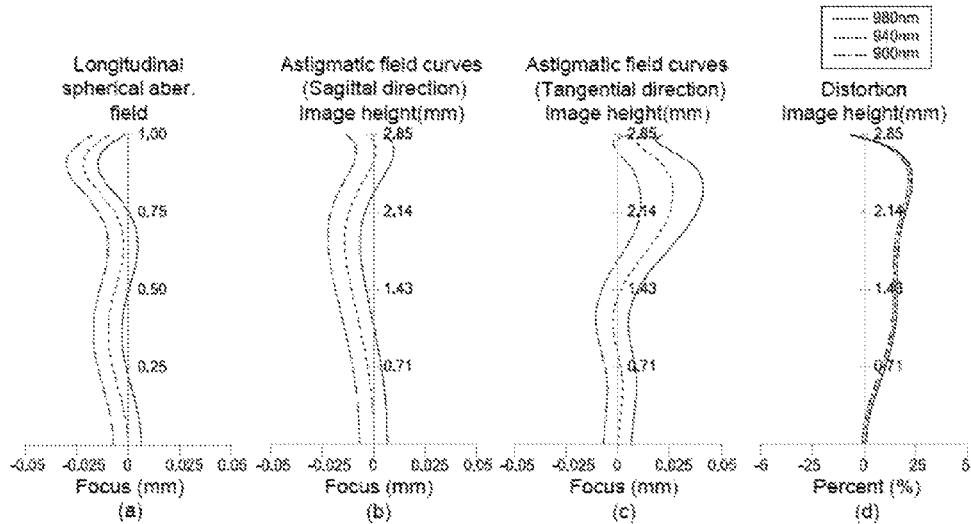
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having six lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, a second lens element 820, a third lens element 830, an aperture stop 800, a fourth lens element 840, a fifth lens element 850 and a sixth lens element 860.

The differences between the eighth embodiment and the first embodiment are the radius of curvature and thickness of each lens element, the distance of each air gap, the configuration of the positive/negative refracting power of the second lens elements 820 and the configuration of the concave/convex shape of the object-side surfaces 851, 861 and the image-side surface 862, but the configuration of the positive/negative refracting power of the first, third, fourth, fifth and sixth lens elements 810, 830, 840, 850, 860 and configuration of the concave/convex shape of surfaces, comprising the object-side surfaces 811, 821, 831, 841 facing to the object side A1 and the image-side surfaces 812, 822, 832, 842, 852 facing to the image side A2, are similar to those in the first embodiment. Specifically, the second lens element 820 has negative refracting power, the object-side surface 851 of the fifth lens element 850 comprises a convex portion 8511 in a vicinity of the optical axis and a concave portion 8512 in a vicinity of a periphery of the fifth lens element 850, the object-side surface 861 of the sixth lens element 860 comprises a convex portion 8611 in a vicinity of the optical axis, a convex portion 8612 in a vicinity of a periphery of the sixth lens element 860 and a concave portion 8613 between the two convex portions 8611 and 8612, and the image-side surface 862 of the sixth lens element 860 comprises a concave portion 8621 in a vicinity of the optical axis, a concave portion 8622 in a vicinity of a periphery of the sixth lens element 860 and a convex portion 8623 between the two concave portions 8621 and 8622. In FIG. 32, the optical characteristics of each lens elements in the optical imaging lens 8 of the present embodiment, wherein the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 are:

T1=0.800 (mm);
G12=2.488 (mm);
T2=0.500 (mm);
G23=1.664 (mm);
T3=1.712 (mm);
G34=0.125 (mm);
T4=1.200 (mm);
G45=5.005 (mm);
T5=1.596 (mm);
G56=0.143 (mm);
T6=1.073 (mm);
BFL=1.353 (mm);
EFL=2.513 (mm);
ALT=6.881 (mm);
AAG=9.425 (mm);
TTL=17.659 (mm);
EFL/G12=1.010;
T3/G56=11.972;
ALT/AAG=0.730;
T6/G56=7.503;
BFL/G45=0.270;
EFL/G23=0.813;
BFL/G56=9.462;
ALT/G45=1.375;
T4/T1=1.500;
ALT/G56=48.119;
AAG/EFL=3.750;
G45/T1=6.256;
G45/T2=10.010;
T6/G45=0.214.

The optical imaging lens 8 which shows that the distance from the object-side surface 811 of the first lens element 810 to the image plane 880 along the optical axis is 17.659 mm, the f-number is 2.00, and the HFOV is 48.81, is capable to provide good imaging quality.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens 8 of the present embodiment, which is capable to provide 48.81 degrees of HFOV and 2.00 of f-number, indeed achieves great optical performance and the shot angle of the optical imaging lens 8 is effectively broadened.

In FIG. 34, the values of T1, G12, T2, G23, T3, G34, T4, G45, T5, G56, T6, BFL, EFL, ALT, AAG, TTL, EFL/G12, T3/G56, ALT/AAG, T6/G56, BFL/G45, EFL/G23, BFL/G56, ALT/G45, T4/T1, ALT/G56, AAG/EFL, G45/T1, G45/T2 and T6/G45 of all eight embodiments are shown, and it is clear that the optical imaging lens of the present invention satisfy the Equations (1), (2), (3), (4), (5), (6), (7), (8), (9), (10), (11), (12), (13) and/or (14).

Figure 35:
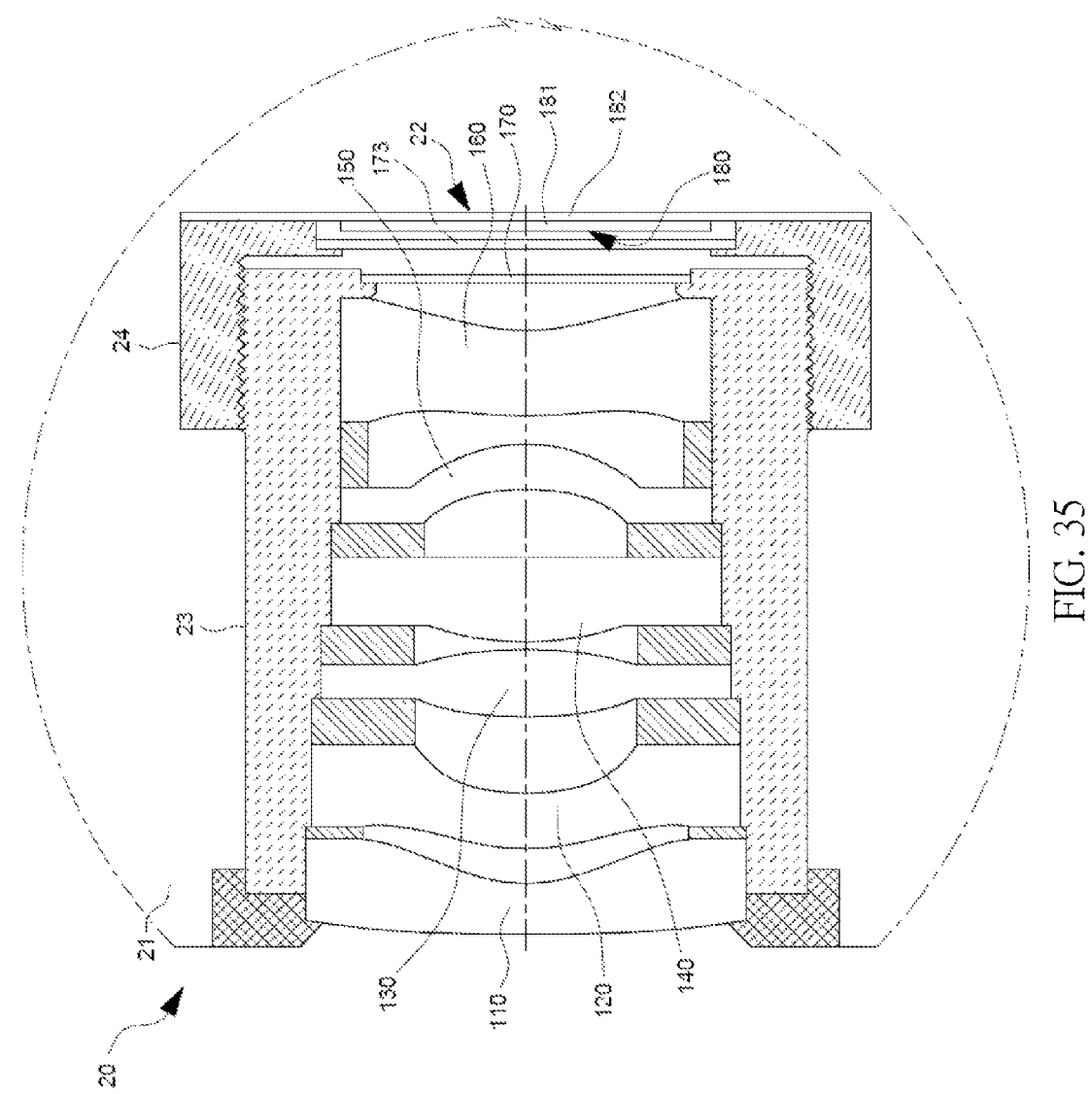
FIG. 35 is a structure of an example embodiment of a camera device.

Reference is now made to FIG. 35, which illustrates an example structural view of a first embodiment of camera device 20 applying an aforesaid optical imaging lens. The camera device 20 comprises a housing 21 and a photography module 22 positioned in the housing 21. Examples of the camera device 20 may be, but are not limited to, gaming machines, such as video game consoles, handhold game console, etc., environmental monitors, event data recorders, reversing camera systems mounted on motor vehicles, wide-angle camera, etc.

As shown in FIG. 35, the photography module 22 may comprise an aforesaid optical imaging lens with six lens elements, for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment comprises a cover glass 173 before the image sensor 181, which does not effect the optical characters of the optical imaging lens 1 or the values of parameters listed in the aforesaid embodiments. All of the exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

Because in the optical imaging lens 1, the distance between the object-side surface 111 of the first lens element 110 and the image plane 180 along the optical axis is 11.437 mm, the f-number is 2.00, and the HFOV is as high as 40.68 degrees, the imaging quality is good. Therefore, compared with current camera devices, the camera device of the present embodiment, which is capable to provide 40.68 degrees of HFOV, indeed achieves good optical characters as well as image quality.

According to above illustration, it is clear that the camera device and the optical imaging lens thereof in example embodiments, through controlling the detail structure of the lens elements, the shot angle of the optical imaging lens is effectively broadened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, a second lens element, a third lens element, a fourth lens element, a fifth lens element and a sixth lens element, each of said first, second, third, fourth, fifth and sixth lens elements having refracting power, an object-side surface facing toward the object side and an image-side surface facing toward the image side, wherein:

said first lens element has negative refracting power;

said image-side surface of said second lens element comprises a concave portion in a vicinity of a periphery of the second lens element;

said object-side surface of said second lens element comprises a convex portion in a vicinity of the optical axis;

said object-side surface of said third lens element comprises a convex portion in a vicinity of the optical axis;

said object-side surface of said fourth lens element comprises a convex portion in a vicinity of a periphery of the fourth lens element;

said object-side surface of said fifth lens element comprises a concave portion in a vicinity of a periphery of the fifth lens element;

said image-side surface of said fifth lens element comprises a convex portion in a vicinity of the optical axis;

said image-side surface of said sixth lens element which is constructed by plastic material comprises a concave portion in a vicinity of the optical axis; and said optical imaging lens comprises only these six lens elements having refracting power, wherein an air gap between the first lens element and the second lens element along the optical axis is G12, a focal length of the optical imaging lens is EFL, and G12 and EFL satisfy the equation:

$1 \leq EFL/G12 \leq 12$.

2. The optical imaging lens according to claim 1, wherein a central thickness of the third lens element along the optical axis is T3, an air gap between the fifth lens element and the sixth lens element along the optical axis is G56, and T3 and G56 satisfy the equation:

$T3/G56 \leq 12$.

3. The optical imaging lens according to claim 1, wherein a sum of the thickness of all six lens elements along the optical axis is ALT, a sum of all five air gaps from the first lens element to the sixth lens element along the optical axis is AAG, and ALT and AAG satisfy the equation:

$ALT/AAG \leq 50$.

4. The optical imaging lens according to claim 1, wherein a central thickness of the sixth lens element along the optical axis is T6, an air gap between the fifth lens element and the sixth lens element along the optical axis is G56, and T6 and G56 satisfy the equation:

$T6/G56 \leq 8$.

5. The optical imaging lens according to claim 4, wherein an air gap between the fourth lens element and the fifth lens element along the optical axis is G45, a back focal length of the optical imaging lens defined by a distance from the image-side surface of the sixth lens element to an image plane on the optical axis, is BFL, and G45 and BFL satisfy the equation:

$BFL/G45 \leq 8$.

6. The optical imaging lens according to claim 5, wherein an air gap between the second lens element and the third lens element along the optical axis is G23, and G23 and EFL satisfy the equation:

$1.5 \leq EFL/G23 \leq 3$.

7. The optical imaging lens according to claim 1, wherein an air gap between the fifth lens element and the sixth lens element along the optical axis is G56, a back focal length of the optical imaging lens defined by a distance from the image-side surface of the sixth lens element to an image plane on the optical axis is BFL, and G56 and BFL satisfy the equation:

$BFL/G56 \leq 35$.

8. The optical imaging lens according to claim 7, wherein an air gap between the fourth lens element and the fifth lens element along the optical axis is G45 a sum of the thickness of all six lens elements along the optical axis is ALT, and G45 and ALT satisfy the equation:

$ALT/G45 \leq 13$.

9. The optical imaging lens according to claim 8, wherein a central thickness of the first lens element along the optical axis is T1, a central thickness of the fourth lens element along the optical axis is T4, and T1 and T4 satisfy the equation:

$1 \leq T4/T1 \leq 7$.

10. The optical imaging lens according to claim 1, wherein an air gap between the fifth lens element and the sixth lens element along the optical axis is G56, a sum of the thickness of all six lens elements along the optical axis is ALT, and G56 and ALT satisfy the equation:

$ALT/G56 \leq 50$.

11. The optical imaging lens according to claim 10, wherein a sum of all five air gaps from the first lens element to the sixth lens element along the optical axis is AAG, and AAG and EFL satisfy the equation:

$AAG/EFL \leq 20$.

12. The optical imaging lens according to claim 1, wherein a central thickness of the first lens element along the optical axis is T1, an air gap between the fourth lens element and the fifth lens element along the optical axis is G45, and T1 and G45 satisfy the equation:

$1 \leq G45/T1 \leq 7$.

13. The optical imaging lens according to claim 1, wherein a central thickness of the second lens element along the optical axis is T2, an air gap between the fourth lens element and the fifth lens element along the optical axis is G45, and T2 and G45 satisfy the equation:

$1.2 \leq G45/T2 \leq 12$.

14. The optical imaging lens according to claim 1, wherein a central thickness of the sixth lens element along the optical axis is T6, an air gap between the fourth lens element and the fifth lens element along the optical axis is G45, and T6 and G45 satisfy the equation:

$T6/G45 \leq 1$.

15. A camera device, comprising:
a housing; and
a photography module positioned in the housing and comprising:
an optical imaging lens comprising, sequentially from an object side to an image side along an optical axis, a first lens element, a second lens element, a third lens element, a fourth lens element, a fifth lens element, and a sixth lens element, each of said first, second, third, fourth, fifth and sixth lens elements having refracting power, an object-side surface facing toward the object side and an image-side surface facing toward the image side, wherein:
said first lens element has negative refracting power;
said image-side surface of said second lens element comprises a concave portion in a vicinity of a periphery of the second lens element;
said object-side surface of said third lens element comprises a convex portion in a vicinity of the optical axis;
said object-side surface of said fourth lens element comprises a convex portion in a vicinity of a periphery of the fourth lens element;
said image-side surface of said fifth lens element comprises a convex portion in a vicinity of the optical axis, and said object-side surface of said fifth lens element comprises a concave portion in a vicinity of a periphery of the fifth lens element;
said image-side surface of said sixth lens element which is constructed by plastic material comprises a concave portion in a vicinity of the optical axis; and
said optical imaging lens comprises only these six lens elements having refracting power, wherein an air gap between the first lens element and the second lens element along the optical axis is G12, a focal length of the optical imaging lens is EFL, and G12 and EFL satisfy the equation:

$1 \leq EFL/G12 \leq 12$;

a lens barrel for positioning the optical imaging lens;
a module housing unit for positioning the lens barrel; and
an image sensor positioned at the image side of the optical imaging lens.

* * * * *